US007559014B2

(12) United States Patent
Naito et al.

(10) Patent No.: US 7,559,014 B2
(45) Date of Patent: Jul. 7, 2009

(54) DISPLAY AND CONTROL OF PERMITTED DATA PROCESSING BASED ON CONTROL INFORMATION EXTRACTED FROM THE DATA

(75) Inventors: Kikuo Naito, Kawasaki (JP); Kunio Seto, Kawasaki (JP); Hideaki Ohshima, Tokyo (JP); Shigeyuki Mitani, Yokohama (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 11/166,162

(22) Filed: Jun. 27, 2005

(65) Prior Publication Data

US 2005/0257273 A1 Nov. 17, 2005

Related U.S. Application Data

(62) Division of application No. 09/318,630, filed on May 26, 1999, now Pat. No. 7,046,258.

(30) Foreign Application Priority Data

May 28, 1998 (JP) ............................... 10-147469
Oct. 6, 1998 (JP) ............................... 10-284309

(51) Int. Cl.
*G06N 3/00* (2006.01)
(52) U.S. Cl. ...................................... 715/201
(58) Field of Classification Search ............... 715/513, 715/517, 523, 530, 234, 243, 254, 255, 200
See application file for complete search history.

(56) References Cited

U.S. PATENT DOCUMENTS 5,384,910 A * 1/1995 Torres .......................... 715/810

5,390,247 A 2/1995 Fischer ........................ 713/176

(Continued)

FOREIGN PATENT DOCUMENTS

JP 05-189176 7/1993

(Continued)

OTHER PUBLICATIONS

Wempen, Faith, "Ten Minute Guide to PowerPoint(r) 97," Que, Dec. 17, 1996, Chapter 16, Section "Working with Layers of Objects," pp. 1-4.*

*Primary Examiner*—Stephen S Hong
*Assistant Examiner*—Kyle R Stork
(74) *Attorney, Agent, or Firm*—Fitzpatrick, Cella, Harper & Scinto

(57) ABSTRACT

A data processing apparatus having a data analysis circuit for extracting data control information from data provided with the data control information to be used for restricting various processes, a data processing circuit for performing various processes for the data added with the data control information, a display unit for displaying a process function of each of the various processes to be executed by the data processing circuit, and a control circuit for controlling the data processing circuit and the display unit in accordance with the data control information extracted by the data analysis circuit, wherein the control circuit inhibits to execute an inhibited process in accordance with the data control information extracted from the data and controls the display unit to change a display style of the process function of each of the various processes to an inhibition display style.

5 Claims, 22 Drawing Sheets

U.S. PATENT DOCUMENTS

| | | | |
|---|---|---|---|
| 5,768,426 A | 6/1998 | Rhoads | 382/232 |
| 5,844,572 A * | 12/1998 | Schott | 345/440 |
| 5,982,891 A | 11/1999 | Ginter et al. | 705/54 |
| 5,983,251 A | 11/1999 | Martens et al. | 708/203 |

FOREIGN PATENT DOCUMENTS

| | | |
|---|---|---|
| JP | 06-28440 | 4/1994 |
| JP | 07-168873 | 4/1995 |
| JP | 08-44524 | 2/1996 |
| JP | 08-263248 | 10/1996 |

\* cited by examiner

| EDITING INHIBIT INFORMATION | CORRESPONDING EDITING INHIBIT LEVEL |
|---|---|
| 0001 | FIRST LEVEL (FREE EDITING) |
| 0002 | SECOND LEVEL (POSSIBLE TO EDIT A PART) |
| 0003 | THIRD LEVEL (IMPOSSIBLE TO EDIT) |

FREE EDIT

POSSIBLE TO EDIT A PART

THROUGH OUTPUT

FIG. 7

| 0001 | |
|---|---|
| 0002 | CONVERT COLOR |
| | IMAGE FILTER |
| | SET TRANSPARENCY |
| | DIFFUSE BOUNDARY |
| | UPSIDE DOWN, INVERSE LEFTSIDE AND RIGHT SIDE |
| | REGISTRATION TO BACKGROUND |
| | UPPER OR LOWER OF OVERLAPS |
| | ROTATE BY VOLUNTARY ANGLE |
| | MASK |
| | INSERT TO PHOTO FRAME |
| 0003 | IMAGE MIX |

FIG. 15

| CONVERT COLOR | 1 |
|---|---|
| IMAGE FILTER | 1 |
| SET TRANSPARENCY | 1 |
| DIFFUSE BOUNDARY | 1 |
| UPSIDE DOWN, INVERSE LEFTSIDE AND RIGHT DIDE | 1 |
| REGISTRATION TO BACKGROUND | 1 |
| UPPER OR LOWER OF OVERLAPS | 1 |
| ROTATE BY VOLUNTARY ANGLE | 1 |
| IMAGE MIX | 2 |
| CHANGE MAGNIFICATION | 3 |

FIG. 22

```
0001  328519215  # USER ID
0002  14152214   # APPLICATION REGISTER NUMBER
0005  1142523    # PRINTER INFORMATION
 ..
 ..
 ..
```
} 1501

DISPLAY AND CONTROL OF PERMITTED DATA PROCESSING BASED ON CONTROL INFORMATION EXTRACTED FROM THE DATA

This application is a division of application Ser. No. 09/318,630, filed May 26, 1999.

BACKGROUND OF THE INVENTION

1. Field of the Invention

The present invention relates to a data processing apparatus, a data supplying apparatus, a data processing method, a data supplying method, a data processing system and a storage medium, which are suitable for use in a system using a program running on a processing apparatus such as a personal computer for performing editing, referring, printing and the like of image data and using a program running on a processing apparatus such as a computer for supplying image data.

2. Related Background Art

The performance of a personal computer has advanced drastically and can easily perform various processes such as editing, referring and printing of image data, audio data, moving image data and the like (hereinafter simply called data or creative data).

Under such environments, data is widely distributed. For example, image data stored in a removable disk such as a CD-ROM can be bought by any one. Audio data, image data, or moving image data can be easily get by using an on-demand distribution service such as communication karaoke services via a network, typically the Internet. Illegal editing, printing, and referring of data are increasing as opposed to an intention of a copyright owner of creative data.

Obscene still and moving images can also be obtained on the creative image user side. A demerit is also increasing, such as an easy access to such still and moving images by minors. Under such backgrounds, a necessity of techniques for restricting to process creative data has become more important nowadays.

According to conventional techniques, a copyright notice, an originating location of image data, a restriction of editing and the like of image data are written in a comment field defined by JFIF (JPEG InterChange Format) which is one of image data formats using generally circulated JPEG compression algorithm. As the method of restricting illegal use of image data, such additional information is notified before the image data is processed, or the originating location of image data is searched if the image data is illegally used.

According to another method, such additional information is made to be forcibly confirmed when image data is to be edited or the image data is to be received at an image processing apparatus, to thereby intend to collectively restrict an illegal use of the image data. With such methods, image data provided with information that the image data is obscene data, may be rejected to be received at an image processing apparatus.

However, with the above-described conventional techniques, only a notice of inhibition contents is given and whether inhibition is accepted or not depends on a judgement on a user side. Therefore, even if there is a notice of restrictions of a partial paste of image data or an overlap on other image data, a user can execute the inhibited operation by neglecting the notice. Restrictions are therefore realized not at all in practice.

If obscene images are restricted by using conventional techniques, processing of the image data is required to be completely inhibited. Therefore, it is impossible to partially restrict the processing of image data, such as allowing image data to be referred to for admiration or enjoyment only and inhibiting editing, printing and the like of the image data by using an image processing apparatus.

In the case of audio data, copyright information may be written in an meta event which is one of data fields defined by an audio data file SMF (Standard MIDI File) using MIDI (Musical Instrument Digital Interface) as a standard of electronic audio data. However, similar to the image data, whether inhibition is accepted or not depends on a judgement on a user side, or processing of audio data is required to be completely inhibited, such as an inhibition of save.

In the case of moving image data, a moving image data file is prevailing which incorporates a moving image compression standard ISO 11172 of MPEG (Moving Picture Expert Group). Similar to audio data and image data, whether inhibition of processing moving image data is accepted or not depends on a judgement on a user side, or processing of obscene moving image data is required to be completely inhibited.

Moving image data recorded with a video recorder has moving image signals provided with a signal inhibiting an illegal copy. This also requires to collectively restrict processing of moving image data. Therefore, it is impossible to partially restrict the processing of moving image data, such as allowing a whole program of moving image data to be copied and inhibiting to form rushes by partially cutting moving image data.

According to the above-described conventional techniques, therefore, if there is any restriction on image data, either processing of the image data is required to be completely inhibited, or it relies upon a judgement on a user side to abandon restriction.

It is therefore difficult to realize restriction matching an intention of a creative data provider by all means. Further, a user of creative data may be restricted unnecessarily.

SUMMARY OF THE INVENTION

It is a first object of the invention to solve the above-described problems and provide techniques of adding control information having a plurality of inhibition levels to image data to thereby allow an image process to be controlled correctly reflecting an intention of an image data provider and allow an image data user to properly process image data.

It is a second object of the invention to explicitly notify restrictions.

A data processing apparatus of this invention, comprises: data analysis means for extracting data control information from data provided with the data control information to be used for restricting various processes; data processing means for performing various processes for the data added with the data control information; display means for displaying a process function of each of the various processes to be executed by the data processing means; and control means for controlling the data processing means and the display means in accordance with the data control information extracted by the data analysis means, wherein the control means inhibits to execute an inhibited process in accordance with the data control information extracted from the data and controls the display means to change a display style of the process function of each of the various processes to an inhibition display style.

The control means may control the display means to display a notice that the data is provided with a process restriction.

The control means may control the display means to display a disabled execution when the inhibited process is selected.

The control means may control the display means to change a display color as the inhibition display style.

The control means may control the display means to blink a display as the inhibition display style.

The data control information may include copyright information or editing inhibition information based upon the copyright information.

The editing inhibition information may include at least one of color conversion, sharpness, transparency, boundary process, inversion, overlap, rotation, mask, insertion to photo frame, and mixture.

The editing inhibition information may be information for stepwise restricting process contents in accordance with an editing inhibition level of the information.

The control means may inhibit to execute an inhibited process in accordance with the editing inhibition level.

The data may be image data.

A data supplying apparatus of this invention comprises: storage means for storing and managing data and data control information; registration means for registering the data and the data control information in the storage means; and data control information providing means responsive to a data distribution request for extracting the data control information corresponding to the data and adding the data control information to the data, wherein in response to the data distribution request, the data and the corresponding data control information are distributed.

A data processing method of this invention comprises: an extracting step of extracting data control information from data provided with the data control information to be used for restricting various processes; and a display step of displaying a process function to be restricted in accordance with the data control information extracted by the extracting step.

A data supplying method of this invention comprises: a registration step of registering data and corresponding data control information; a storage step of storing and managing the data registered at the registration step; and a provision step of extracting the data control information from the data and adding the data control information to the data, in response to a data distribution request.

A data processing system of this invention comprises: a data supplying apparatus for distributing data and corresponding data control information in response to a data distribution request; and a data processing apparatus for restricting to executed an inhibited process in accordance with the data control information extracted from the data and controlling display means to determine a display style of a process function of each of various processes, wherein: the data supplying apparatus comprises; storage means for storing and managing the data and data control information; registration means for registering the data and the data control information in the storage means; and data control information providing means responsive to the data distribution request for extracting the data control information corresponding to the data and adding the data control information to the data; and the data processing apparatus comprises: data analysis means for extracting the data control information from the data provided with the data control information to be used for restricting the various processes; data processing means for performing the various processes for the data added with the data control information; display means for displaying a process function of each of the various processes to be executed by the data processing means; and control means for controlling the data processing means and the display means in accordance with the data control information extracted by the data analysis means, wherein the control means inhibit to execute an inhibited process in accordance with the data control information extracted from the data and controls the display means to change a display style of the process function of each of the various processes to an inhibition display style.

A computer readable storage medium of this invention stores a program for executing: an extracting step of extracting data control information from data provided with the data control information to be used for restricting various processes; and a display step of displaying a process function to be restricted in accordance with the data control information extracted by the extracting step.

A computer readable storage medium of this invention stores a program for executing: a registration step of registering data and corresponding data control information; a storage step of storing and managing the data registered at the registration step; and a provision step of extracting the data control information from the data and adding the data control information to the data, in response to a data distribution request.

In the embodiments of the invention, the above-described technical means are provided so that if there are some restrictions on creative data, various types of restrictions can be realized in accordance with each control data limitation level added to the creative data. It is therefore possible to realize restrictions matching an intention of the creative data provider. It is also possible to realize restrictions without unnecessarily restricting a creative data user. It is also possible to explicitly notify the restrictions on creative data.

A data supplying apparatus of this invention comprises: distributing means responsive to a data distribution request for distributing data and control information for restricting various processes to be performed for the data at a plurality of levels, to a distribution requesting side.

A data processing apparatus of this invention comprises: data processing means for processing data: and control means for regulating a process to be executed by the data processing means.

A data processing system of this invention comprises: a data supplying apparatus comprising distributing means responsive to a data distribution request for distributing data and control information for restricting various processes to be performed for the data at a plurality of levels, to a distribution requesting side; and a data processing apparatus comprising: data requesting means for issuing a request for a distribution of the data to the data supplying apparatus; data processing means for processing the data; and control means for regulating the data processing to a level represented by the distributed control information.

A computer readable storage medium of this invention stores a program executing: a distributing step of distributing, in response to a data distribution request, data and control information for restricting various processes to be performed for the data at a plurality of levels, to a distribution requesting side.

A computer readable storage medium of this invention stores a program executing: a step of processing data: and a step of regulating a process to be executed for the data by the data processing step in accordance with control information which restricts to execute the process at a plurality of levels.

A computer readable storage medium of this invention stores a program executing: a step, to be executed at a data supplying apparatus, of distributing, in response to a data distribution request, data and control information for restricting various processes to be performed for the data at a plurality of levels, to a distribution requesting side; and steps, to be executed at a data processing apparatus, of issuing a request for a distribution of the data to the data supplying apparatus, of processing the data, and of regulating the data processing to a level represented by the distributed control information.

BRIEF DESCRIPTION OF THE DRAWINGS

FIG. 7 illustrates control data to be used by a control means, according to the first embodiment.

FIG. 15 illustrates control data to be used by the control means, according to a sixth embodiment of the invention.

FIG. 22 is a diagram showing an example of the structure of a data file which stores information on a data processing apparatus, the information being inquired to the data control information management means.

DETAILED DESCRIPTION OF THE PREFERRED EMBODIMENTS

First Embodiment

A data processing apparatus, a data supplying apparatus, a data processing method, a data supplying method, a data processing system and a storage medium according to the first embodiment of the invention will be described. In the following embodiments, image data of creative or original data is used by way of example.

Figure 1:
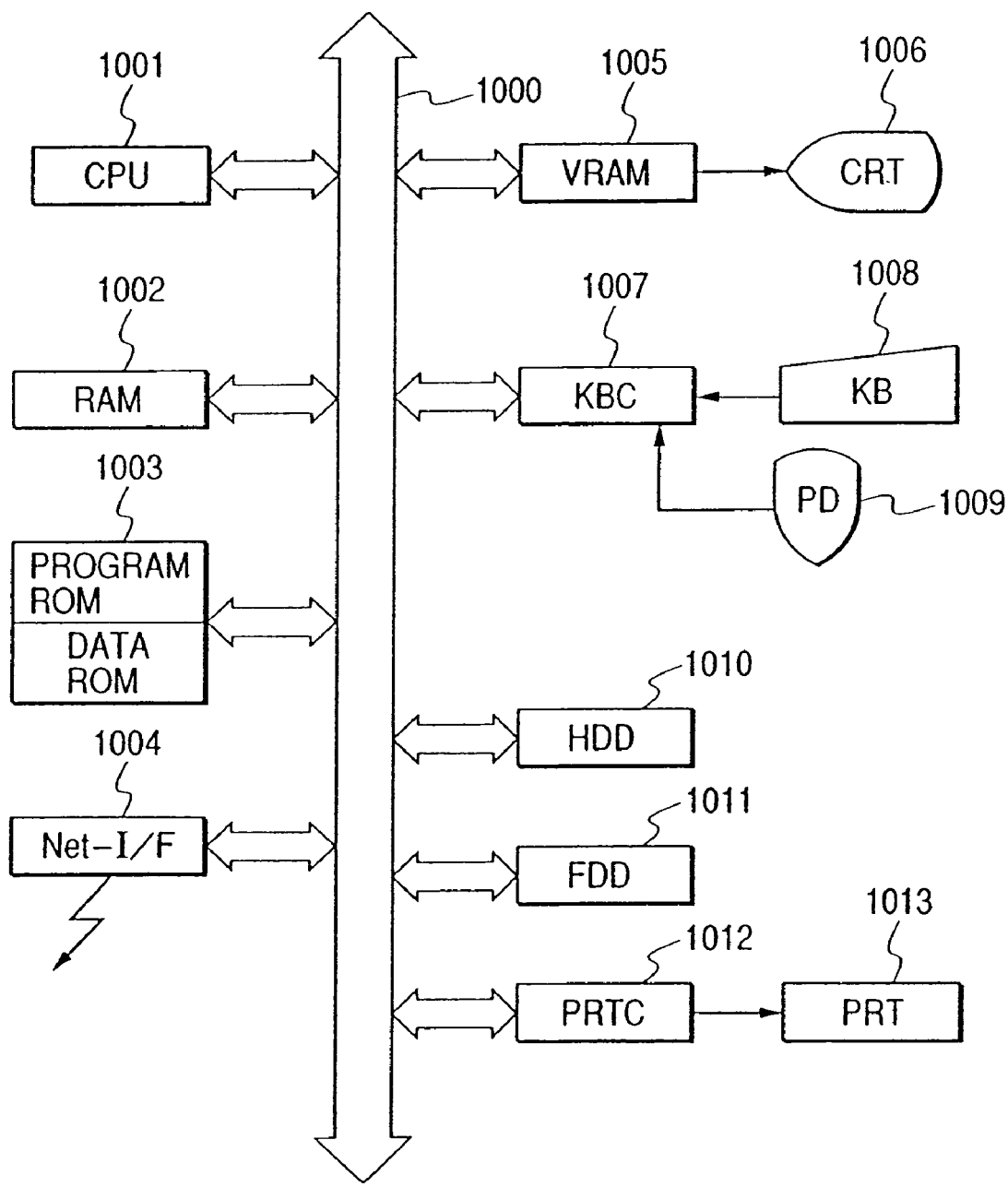
FIG. 1 is a schematic diagram showing a system configuration of a computer included in an image data processing apparatus and an image supplying apparatus, according to a first embodiment of the invention.

FIG. 1 is a block diagram showing the system structure of an information processing apparatus (computer) used by the present invention. The embodiment can be realized by both a server/client system and a stand-alone system, the former including a client computer a user directly can operate upon and a server computer which supplies resources such as image data and programs to a network.

The internal structures of a server computer and a client computer of a server/client system are similar to each other. The internal structure of a stand-alone computer is also similar to that of a computer of the server/client system, excepting a network interface (Net-I/F) 1004. Therefore, all types of computers will be described with reference to FIG. 1.

Referring to FIG. 1, reference numeral 1001 represents a CPU for controlling the entirety of the apparatus. Reference numeral 1002 represents a RAM which functions as a main memory of CPU 1001, a working area for executable programs, and a temporary data save area.

Reference numeral 1003 represents a ROM which stores an operation procedure of CPU 1001. ROM 1003 includes a program ROM storing a system program (basic software: OS) for controlling a print service controller and a data ROM storing data necessary for running the system.

The system program of a computer, particularly a client computer, regulates an editing operation itself in accordance with regulation data to be used for restricting image data editing to be later described, and this system program only allows to receive image data distributed from a server.

Reference numeral 1004 represents the network interface (Net-I/F) which is used for the control of data transfer to and from a network data server and for the control, diagnosis and the like of data transfer to and from a network system (the Internet or the like), to be described later.

Reference numeral 1005 represents a video RAM (VRAM) for developing an image to be displayed on a screen of a CRT 1006 and for controlling the display operation.

Reference numeral 1007 represents a keyboard controller for controlling a signal input from an external input device such as a keyboard. Reference numerals 1008 and 1009 represent an external input device such as a keyboard (KB) 1008 and a pointing device (PD such as a mouse) 1009.

Reference numeral 1010 represents a hard disk drive (HDD) which is used for storing application programs and image data to be described later.

Reference numeral 1011 represents a removable disk drive (FDD) such as a floppy disk drive and a CD-ROM drive, which is used for reading an application program from a storage medium and for reading/writing image data, to be described later.

Reference numeral 1012 represents a printer controller (PTRC) which controls an external output device 1013.

The external output device 1013 is used for outputting processed data, and is a printer for example. Reference numeral 1000 represents an I/O bus (address bus, data bus, control bus) for connection to each unit.

Figure 2:
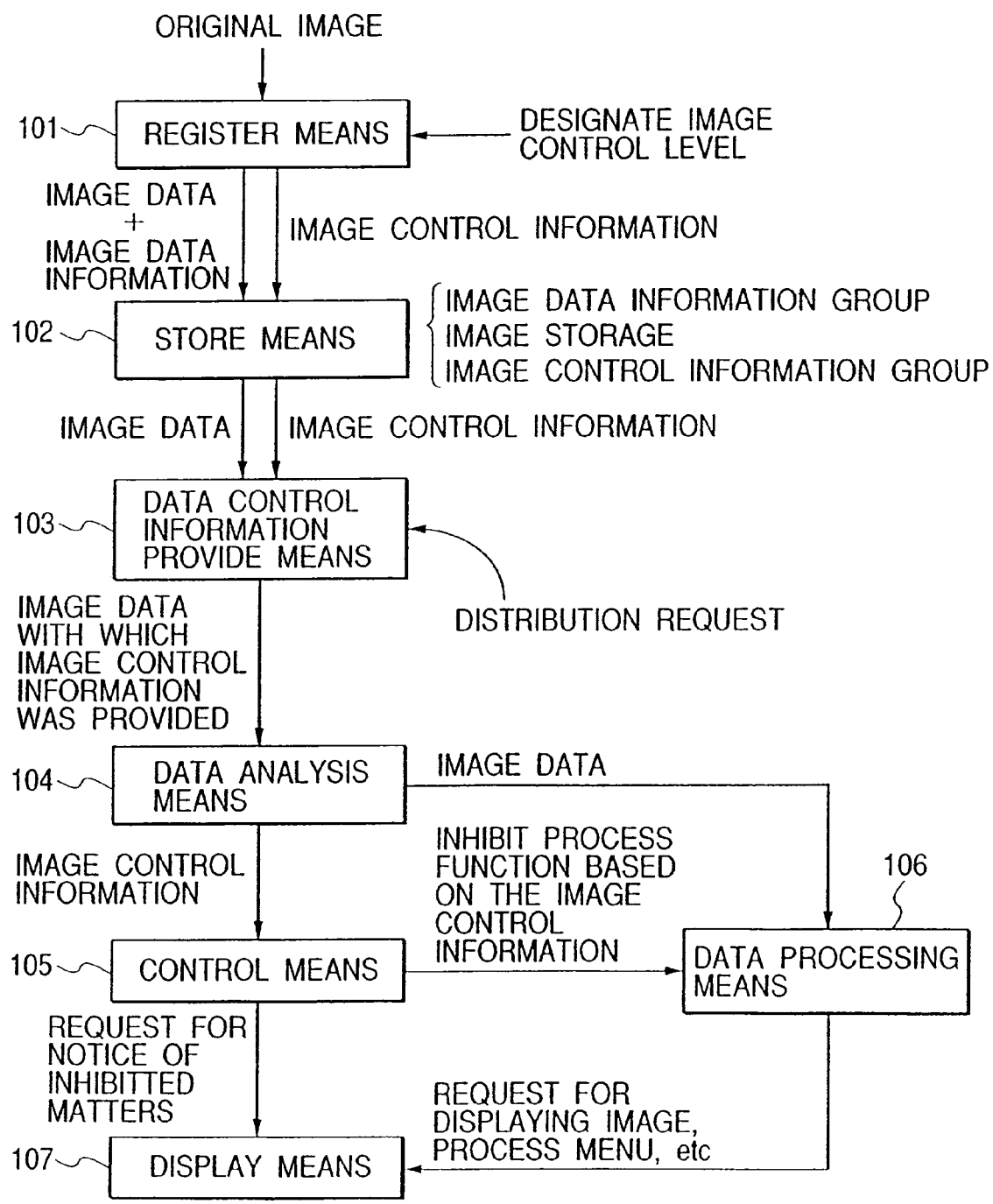
FIG. 2 shows a module structure to be used in the first to sixth embodiments of the invention.

FIG. 2 is a block diagram showing the functional structure and data flow of the information processing apparatus of the embodiment.

Referring to FIG. 2, reference numeral 101 represents a registration means for registering image data and image control information.

Reference numeral 102 represents a storage means which stores in advance image data and image control information or stores image data and image control information supplied from the registration means. The storage means 102 may be a generally used database system.

Reference numeral 103 represents a data control information providing means which in response to a distribution request for desired data, acquires the desired image data and its image control information from the storage means 102 and provides the image data with the image control information for editing restriction by utilizing a comment field or the like of the image data.

Reference numeral 104 represents a data analysis means which extracts the image control information from the image data provided with the image control information by the data control information providing means 103. Reference numeral 105 represents a control means for controlling a data processing means 106 and a display means 107 to restrict the editing operation, in accordance with the image control information extracted by the data analysis means 104.

Reference numeral 106 represents the data processing means which processes image data supplied from the data control information providing means 103 for data editing, printing and the like, or temporarily stores the image data for preparing for such data processing.

Reference numeral 107 represents the display means which displays the contents of data, a function menu provided by the data processing apparatus, and data control information, under the control of the control means 105.

Figure 3:
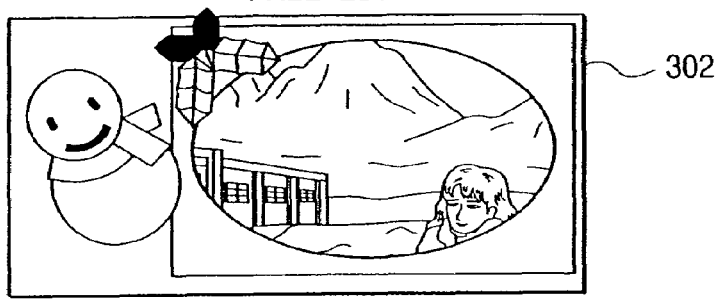
FIG. 3 illustrates image control information and the results of images processed by an image data processing apparatus, according to the first embodiment.
Figure 3:
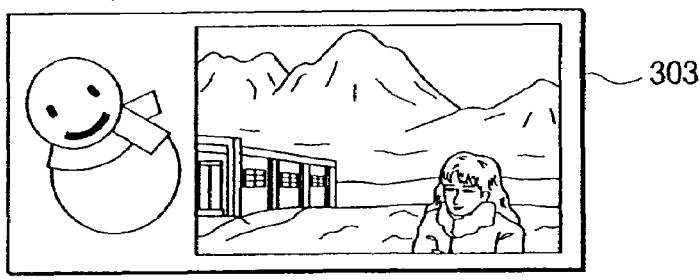
Figure 3:
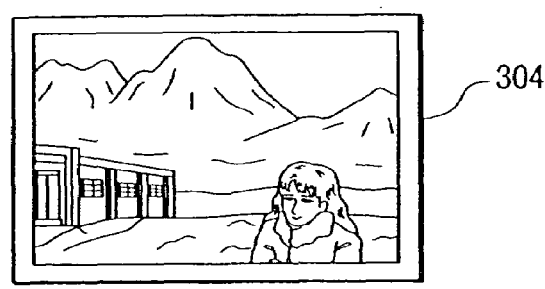

FIG. 3 illustrates image data control information and examples of image data edited in accordance with the image data control information. The image data control information is information on restrictions of editing, print size, commercial use at various degrees, and the like, respectively of image data. In order to reflect an intention of an image data provider as correctly as possible, each restriction condition can be expressed at a plurality of restriction levels, such as a stepwise restriction of an editing function.

The image data control information is generally expressed in such a manner that the control means at a client can control as easily as possible a restriction or inhibition item of image data and a restriction or inhibition level of each item. For example, the image data control information is represented by numerals or bit trains.

In this embodiment, in order to facilitate to understand the present invention clearly, information on stepwise inhibition of an editing item for the client data processing means is used as the image data control information. In this embodiment, the image data control information is called "editing inhibition information" where applicable.

Referring to FIG. 3, reference numeral 301 represents a list of editing inhibition information and a corresponding editing inhibition level. The inhibition information has three levels in this embodiment, each being expressed by a numeral.

More specifically, a first level is expressed by "0001", the second level is expressed by "0002", and the third level is expressed by "0003". In this embodiment, each level of the editing inhibition is made stepwise relative to an editing item. At the first level (editing inhibition information "0001"), any editing inhibition is not set and an editing operation can be made freely. At the second level (editing inhibition information "0002"), an editing operation is permitted in a range that the image is not damaged, i.e., in a range that sameness or discrimination of an original image can be maintained. At the third level (editing inhibition information "0003"), any kind of an editing operation is inhibited in order to retain the original image generally perfectly. The editing function restricted at each level is as follows.

The first level does not restrict any editing function item.

The second level restricts editing operations such as: color conversion (brightness/contrast and the like); image filer (sharpness and the like); transparency setting; boundary diffusion; upside down; inverted right and left sides; registration to background; upper or lower of overlaps; rotation by optional angle; mask; insertion to photo frame; and the like.

The third level restricts image mixture in addition to those editing functions restricted at the second level. A magnification change (re-sizing) is not particularly suppressed because the original is maintained with the same aspect ratio of image data.

Reference numeral 302 in FIG. 3 represents an editing example at the first level (free editing). Reference numeral 303 represents an editing example at the second level (partially restricted editing), and reference numeral 304 represents an editing example at the third level (all editing operations are inhibited).

In this embodiment, an editing operation is restricted stepwise by setting an available editing item at each level. According to the invention, a stepwise restriction may be set to each editing function. For example, an available range of color conversion and re-sizing may be restricted stepwise at each level, or a range and degree of rotation angle and mask may be restricted stepwise. An editing operation may be restricted in accordance with a re-sized size. Namely, if an image has a size small to a certain degree, the effect of edition is small so that all the editing operations may be permitted.

Figure 4:
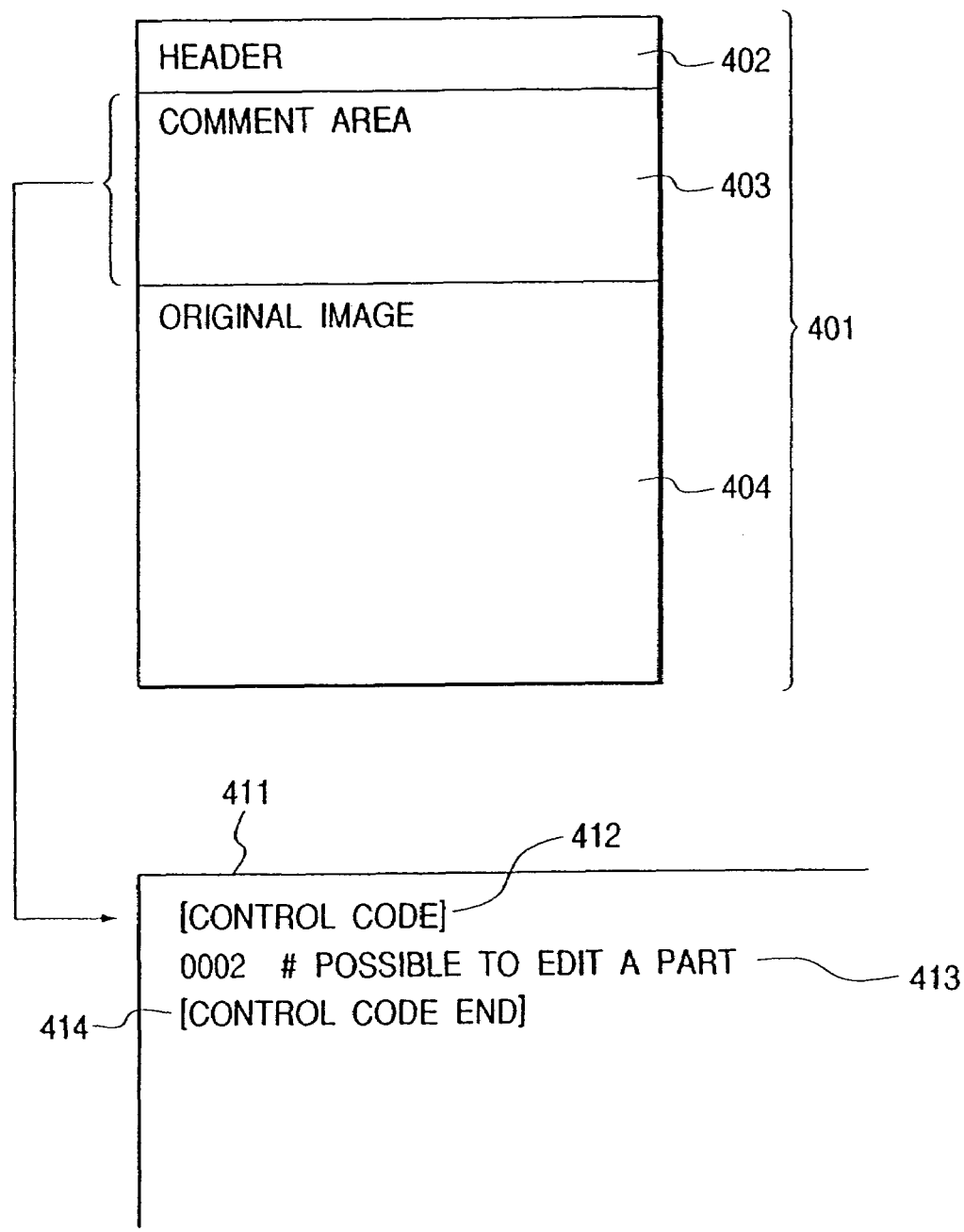
FIG. 4 shows a format of image data and image control information added to the image data, according to the first embodiment.

FIG. 4 shows the format of an image data file 401 of this embodiment. The image data file 401 has a file header field 402, a comment field 403, and an original image field 404. The file header field 403 stores supplemental information of the image data file such as a type, size, compression factor and the like of the image data file. The comment field 403 stores comments for the image data. The original image field 404 stores an entity of image data itself. In this embodiment, the image data control information is stored in the comment field 403 of the image data file.

Examples of the image data control information to be stored in the comment field 403 will be described.

Referring to FIG. 4, reference numeral 411 represents an example of the image data control information according to the embodiment. In this embodiment, the image data control information is described by an image data control information start identifier 412, an image data control information entity 413 and an image data control information end identifier 414.

More in detail, the image data control information start identifier 412 indicates the start of the image data control information to discriminate between the image control information and other information in the comment field. In this embodiment, it is expressed by parentheses [ ] and a character string, i.e., by [control code].

The start identifier 412 is used mainly by the data analysis means 104 to locate the start position of the image data control information when the data analysis means 104 extracts the image data control information. Therefore, in place of the character string of the embodiment, a specific bit train only the data analysis means 104 knows may also be used.

The image data control information entity 413 indicates that the second level of the editing inhibition information is set. "0002" indicates the second level of the editing inhibition information. Instead of the numeral string, a bit string may be used. The next "#" is a comment identifier for indicating that the following information is a comment on the editing inhibition information.

In this embodiment, although "#" is used as the comment identifier, a comment descriptor such as in a program descriptive language is generally used. The comment descriptor may be expressed by a bit train the data analysis means 104 can recognize. The character string "possible to edit a part" following the comment descriptor is a comment on the editing inhibition information.

The comment descriptor and comment may be omitted, which means that they are not essential for the data analysis means 104 to extract the image data control information. The image data control information end identifier 414 indicates the end of the image data control information.

In this embodiment, the image data control information end identifier 414 is expressed by the [control code end], in the manner similar to the image data control information start identifier 414. In this embodiment, the image data control information is stored in the comment field 403. The comment field 403 generally stores at the same time other information such as image creation information and a comment of a creator. Therefore, the start and end identifiers 412 and 414 are used to discriminate the image data control information from other information.

Figure 5:
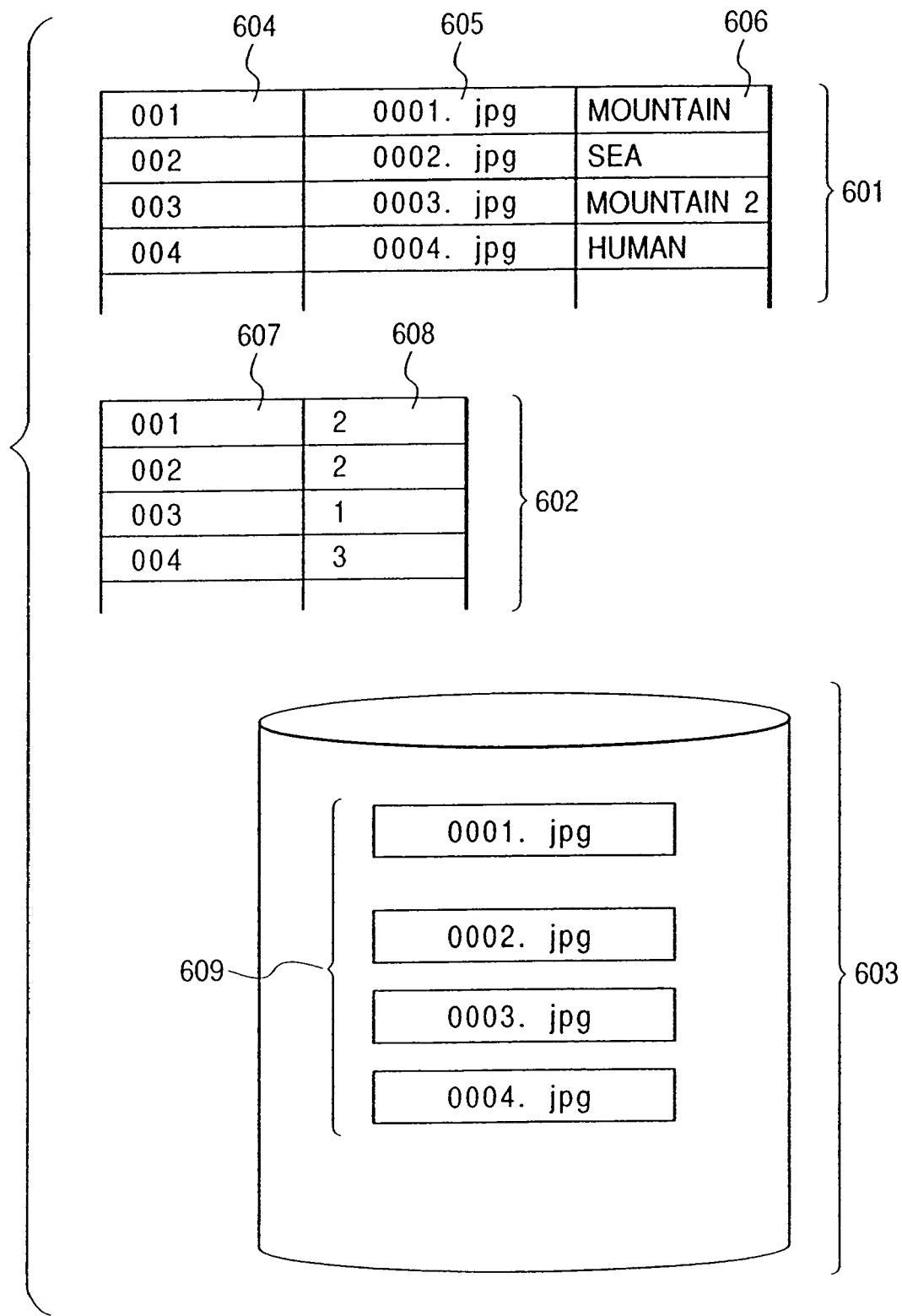
FIG. 5 shows an example of the structure of image data and image control information stored in a storage means, according to the first embodiment.

FIG. 5 shows an example of image data and image data control information to be stored in the storage means 102 shown in FIG. 2. In this embodiment, the storage means 102 uses a storage such as a relational database (hereinafter abbreviated as DB) and a hard disk generally used in the art.

Referring to FIG. 5, reference numeral 601 represents an image data information group stored in DB, and reference numeral 602 represents an image data control information group stored in DB. Reference numeral 603 represents an image data storage for storing an image data file entity group of image data represented by image data information in the image data information group 601.

Each set of image data information in the image data information group is stored in DB as one record. In this embodiment, one record is constituted of three members.

The first member is an image number 604 which is a serial number of the image data information stored in the storage means 102 and is used for identifying the image data information. The image number 604 is automatically assigned when the registration means 101 registers image data information in the storage means 102.

The second member is an image data file name 605 which identifies a specific set of image data of the image data entity group stored in the image data storage. In this embodiment, the image data file name stored in the image data storage is used as the second member.

The third member is an image data name 606. This embodiment may be realized even if the image data name is not stored in the third member. One set of image data is represented by one record including the first to third members 604, 605 and 606. For example, the first record shown in FIG. 5 is constituted of the three members including the image number of "001", image data fine name of "001.JPG" and image data name of "mountain". DB stores records same in number as the number of image data sets stored in the image data storage 603.

The image data control information group 602 stored in DB has the following two members per one record.

The first member is an image number 607 which is the same number as the image number 604 in the first member of a corresponding record of the image data information group 601.

If the record of the image data information group 601 has the image number 604 same as the image number 607 of the image data control information group 602, both the records correspond to the same image data.

The second member is an image data control information entity 608 corresponding to the image number 607 and storing the image data control information described with FIG. 2. The image data storage 603 stores the image data file entity group. Reference numeral 609 represents respective image data files.

Figure 6:
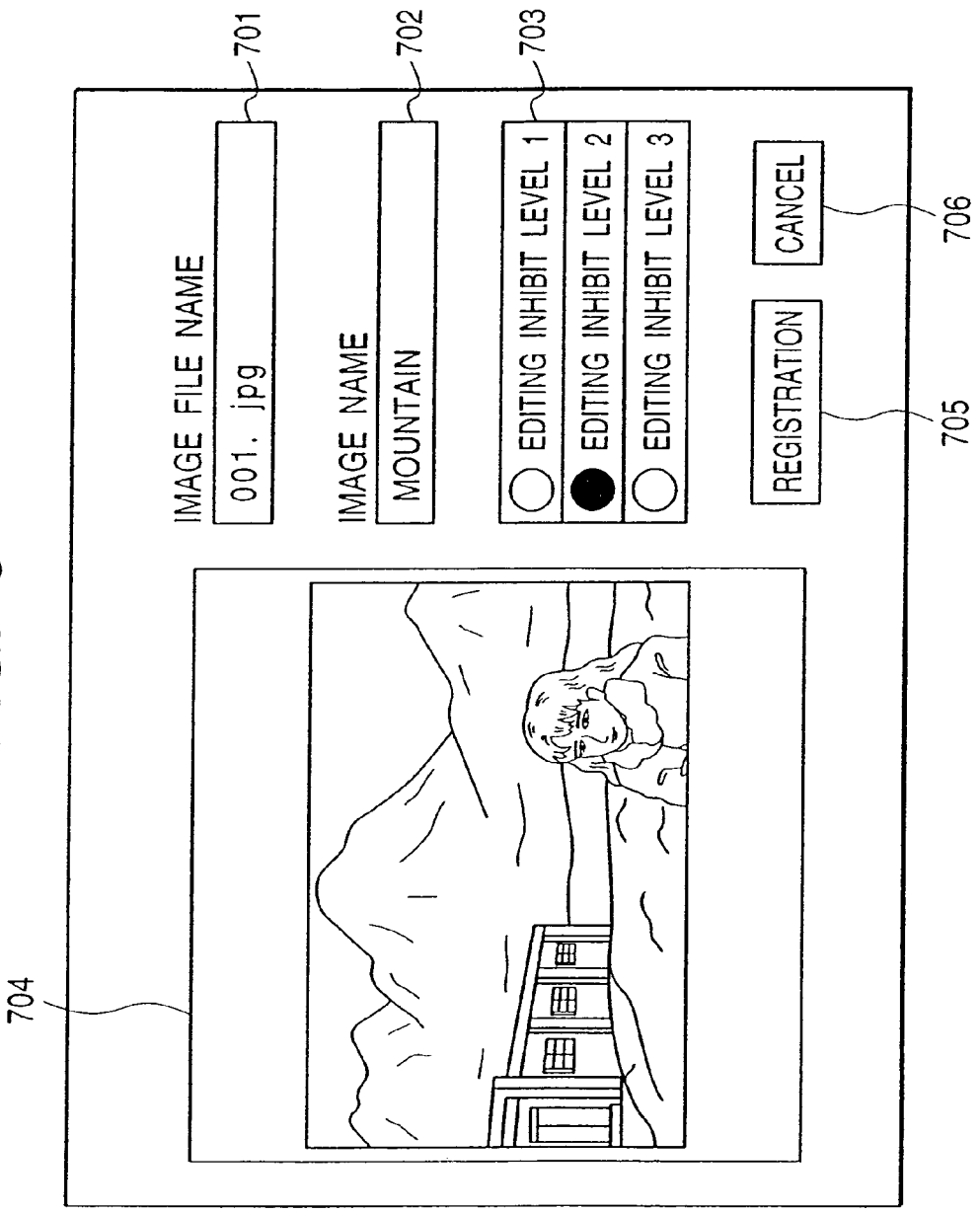
FIG. 6 shows an example of a display screen given by a registration means, according to the first embodiment.

FIG. 6 shows an example of a display screen given by the registration means 101 of the embodiment.

Referring to FIG. 6, reference numeral 701 represents a image file name box for designating the name of an image data file to be registered.

Reference numeral 702 represents an image name box for designating the name of image data to be registered, and reference numeral 703 represents an editing inhibition information box for designating the level of editing inhibition information which is the image data control information of this embodiment.

Reference numeral 704 represents an image preview screen for displaying an image when the image file name is entered in the image file name box 701. Reference numeral 705 represents an image registration instruction button for instructing to register image data. Reference numeral 706 represents an image data registration cancelling button for cancelling a registration made by the registration means.

FIG. 7 shows control data which is used to restrict the editing operation to be performed by the image data processing apparatus, in accordance with the editing inhibition information of the embodiment. This control data is grouped into inhibition functions at each editing inhibition level.

Only the editing operations newly added to each level are stored in a group, because the other editing operations to be inhibited at this level can be referred to those at lower levels.

In this embodiment, the editing inhibition functions described with FIG. 3 are used and grouped as in the following.

First level: none.

Second level: color conversion (brightness/contrast and the like); image filer (sharpness and the like); transparency setting; boundary diffusion; upside down; inverted right and left sides; registration to background; upper or lower of overlaps; rotation by optional angle; mask; insertion to photo frame; and the like.

Third level: image mixture.

In this embodiment, the functions of the data processing means 106 are grouped in accordance with the editing inhibition information. As in another embodiment to be described later, it is obvious that the following data structure may also be incorporated. Namely, all the functions of the data processing means 106 may be listed and editing inhibition information is provided to each function.

(Data Flow and Process)

Next, a data flow and a series of processes according to the embodiment will be described with reference to FIGS. 1 to 11.

First, with reference to FIG. 2, the data flow and a series of processes of the embodiment will be described.

The registration means 101 registers an original image and original image data control information in the storage means 102.

Next, a distribution request for the image data to be processed and stored in the storage means 102 is issued to the image data control information providing means 103. The image data control information providing means 103 acquires the image data and image data control information from the storage means 102, and adds the image data control information to the image data to pass the image data image data with the image data control information to the data processing means 106.

When an image data processing start command is issued, a preliminary process is executed. Namely, the data analysis means 104 extracts the image data control information from the image data, and the control means 105 instructs the data processing means 106 to make an operator be impossible to select the function inhibited before the processing start and instructs the display means 107 to display information in accordance with the inhibition contents.

The operation will be detailed with reference to flow charts.

With reference to FIGS. 8, 1, 6 and 5, the processes to be executed by the registration means 101 to register the image data and editing inhibition information in the storage means 102 will be described.

Figure 8:
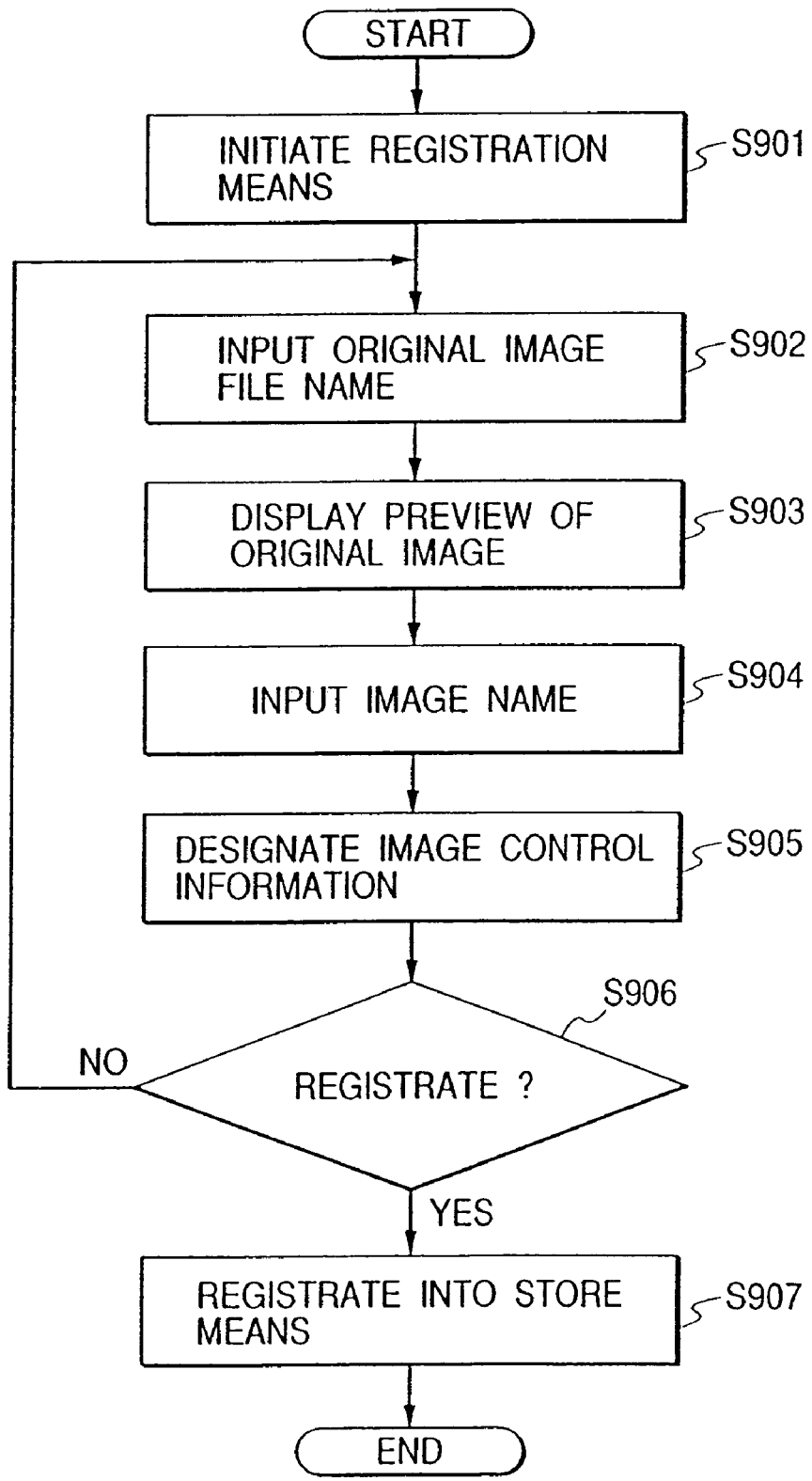
FIG. 8 is a flow chart illustrating a process to be executed by the registration means to register image data and image control information in a storage means, according to the first embodiment.

FIG. 8 is a flow chart illustrating a process to be executed by the registration means 101 to register the image data and editing inhibition information in the storage means 102, according to the embodiment.

As shown in FIG. 8, when the process starts, first at Step S901 an operator instructs an operation start at an arbitrary timing by using an input device such as keyboard 1008 and pointing device 1009 to thereby initiate the registration means 101 which is constituted of programs stored in HDD 1010.

As the registration means 101 is initiated, at Step S902 CRT 1006 displays the display screen shown in FIG. 6. The operator enters the drive name and file name in the image file name box 701 by using an input device such as keyboard 1008 and pointing device 1009 to read the original image to be registered and stored in an external storage device such as a CD-ROM from the removable disk drive 1011.

At Step S903 the original image is picked up in accordance with the drive name and file name entered at Step S902 and displayed on the preview screen 704.

Next, at Step S904 the operator enters the name of the image to be registered in the image name box 702 while confirming the original image displayed on the preview screen.

Next, at Step S905 the editing control information is designated in the editing control information box 703. In this embodiment, one of the three levels is selected.

Next, at Step S906 the operator judges whether or not the image data is registered, by confirming the image file name box 701, image name box 702, editing control information box 703 and preview screen 704.

If the image data is judged to be registered, at Step S907 a registration instruction is issued, for example, by clicking the image registration instruction button 705 with the pointing device 1009.

If the image data is judged at Step S906 not to be registered, the flow returns to Step S902 to repeat the above operations.

Next, with reference to FIGS. 9, 2, 4 and 5, a process of adding image data control information and distributing image data when a distribution request for the image data is issued, will be described.

Figure 9:
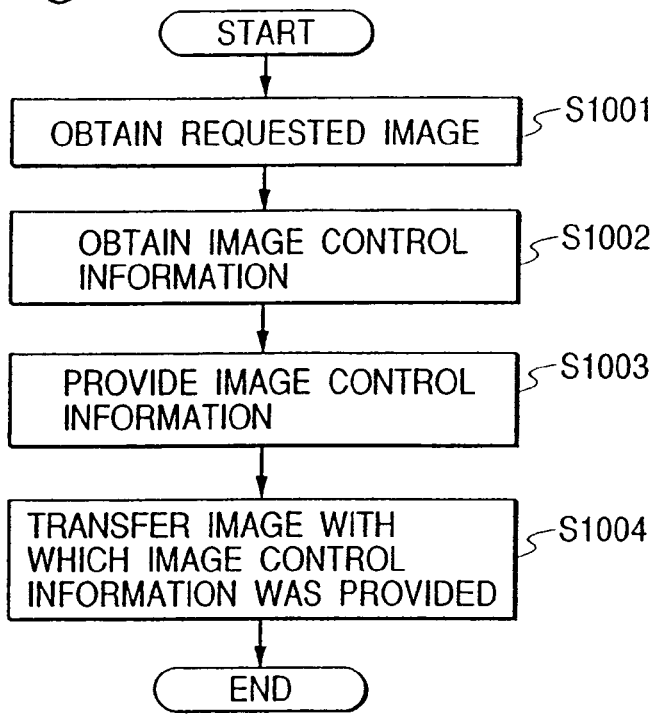
FIG. 9 is a flow chart illustrating a process to be executed by an image control information providing means, according to the first embodiment.

FIG. 9 is a flow chart illustrating a process to be executed by the data control information providing means 103 to provide the data control information and distribute the image data. In the following description, it is assumed that a distribution request is issued to the data control information providing means 103 when an operator desires editing, printing and the like of image data stored in the storage means 102.

First, at Step S1001 upon reception of the distribution request, the data control information providing means 103 acquires image data requested. In acquiring the image data, a record corresponding to the desired image data is searched from the image data information group 601 stored in the storage means 102, and the image data file having the file name stored in the image data file name 605 in the corresponding member is read from the image data storage 603.

Next, at Step S1002 the data control information providing means 103 searches the image data control information group 602 stored in the storage means 102 and acquires the image data control information of the desired image data. Searches at Steps S1001 and S1002 are realized by a general search method because the storage means 102 is constituted of a general DB system. The detailed description of search is therefore omitted.

Next, at Step 1003 the image data control information is entered in the comment field of the image data file acquired at Step S1001, as shown in FIG. 4.

Next, at Step S1004 the image data file provided with the image data control information is transferred.

Next, with reference to FIGS. 10, 1, 2, 4, 7 and 11A to 11C, a process to be executed by the control means 105 to control the data processing means 106 in accordance with the image data control information and to control the display means 107 to make it give a notice to an operator, will be described. In this embodiment, a process to be executed by the control means 105 to suppress in advance the functions of the data processing means 106 will be described.

Figure 10:
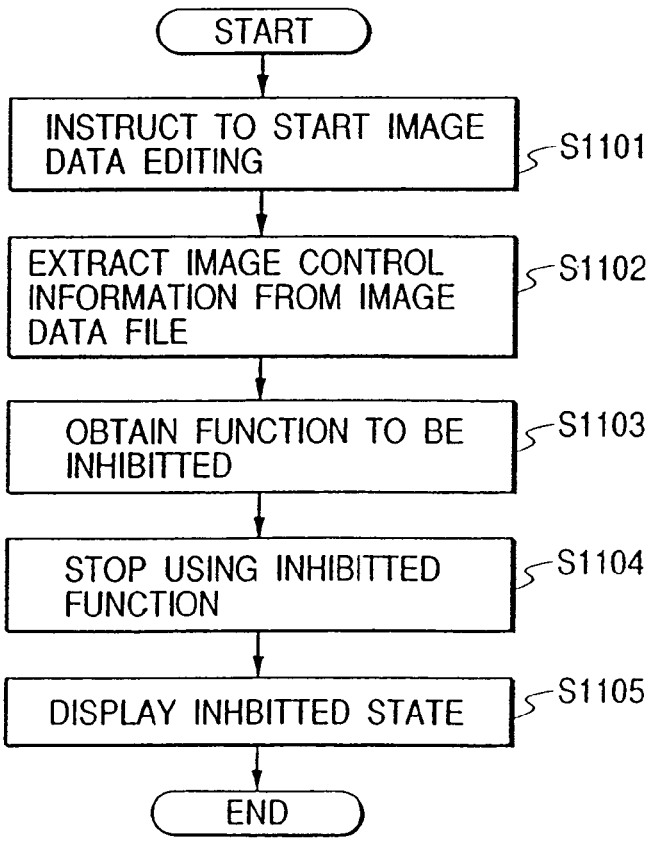
FIG. 10 is a flow chart illustrating a process to be executed by a control means, according to the first embodiment.

FIG. 10 is a flow chart illustrating an operation of the data analysis means 104 to analyze the image data distributed from the data control information providing means 103 and extract the image data control information, and an operation of the control means 105 to control the data processing means in accordance with the image data control information and control the display means 107 to make it give a notice of the inhibition contents.

A series of processes to be described with this flow chart is assumed that the data processing means 106 is already activated because the processes are performed as a preliminary process of the data processing means 106 when an operator instructs the data processing means 106 to start image data processing such as editing and printing.

Referring to FIG. 10, first at Step S1101 an operator instructs the data processing means 106 to edit the image data.

Next, at Step S1102 the data analysis means extracts the image data control information from the image data file which was instructed to be edited at Step S1101. In this embodiment, since the image data control information is entered in the comment field of the image data file as shown in FIG. 4, the data analysis means 104 analyzes whether the image data control information start identifier 412 exists in the comment field. If it is judged from this analysis that the image inhibition information exists, the image data control information entity 413 is extracted. In the example shown in FIG. 4, the character string "0002" is extracted.

Next, at Step S1103 in accordance with the image data control information extracted at Step S1102, the control means 105 acquires the editing function to be inhibited from the control data shown in FIG. 7 in order to suppress the editing function of the data processing means 106.

For example, if the image data control information extracted at Step S1102 is the editing inhibition first level which has no editing inhibition, there is no control data to be acquired, whereas if it is the second level, the control data at the second level is acquired, and if it is the third level, the control data at the second and third levels is acquired.

Next, at Step S1104 the control means 105 notifies the data processing means 106 of the inhibition function acquired at Step S1103 to inhibit to use the function.

Next, at Step S1105 the control means 105 instructs the display means 107 to display a notice of the inhibition function acquired at Step S1103 or instructs the display means 107 to display information on the data processing means 106 with the inhibition function acquired at Step S1104. When the process of the flow chart shown in FIG. 10 is completed, the data processing means 106 is enabled to process the image data.

Next, with reference to FIGS. 11A to 11C and FIG. 10, the editing inhibition of the image data based upon the image data control information according to the embodiment will be described.

Figure 11A:
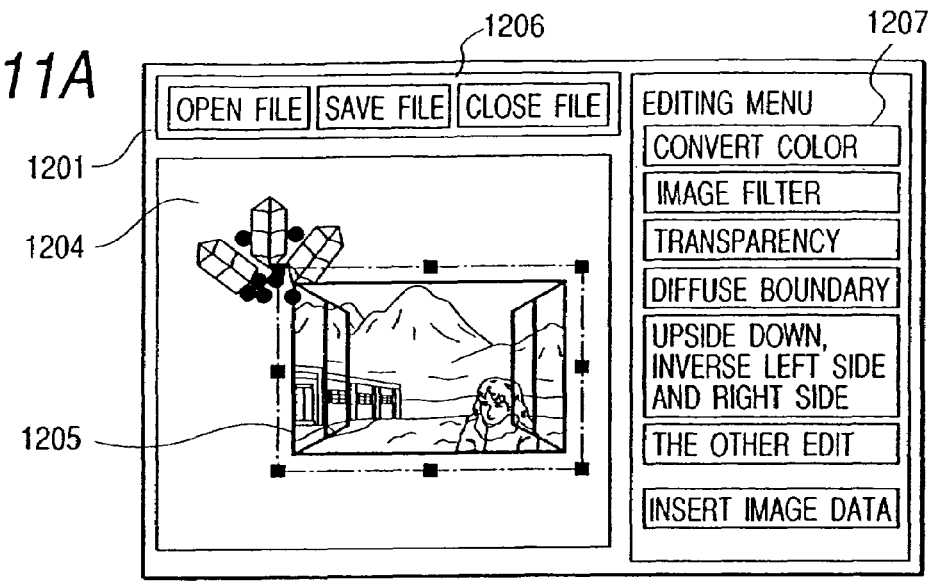
FIGS. 11A, 11B and 11C are diagrams showing an example of display screens given by a data processing means, according to the first embodiment.
Figure 11B:
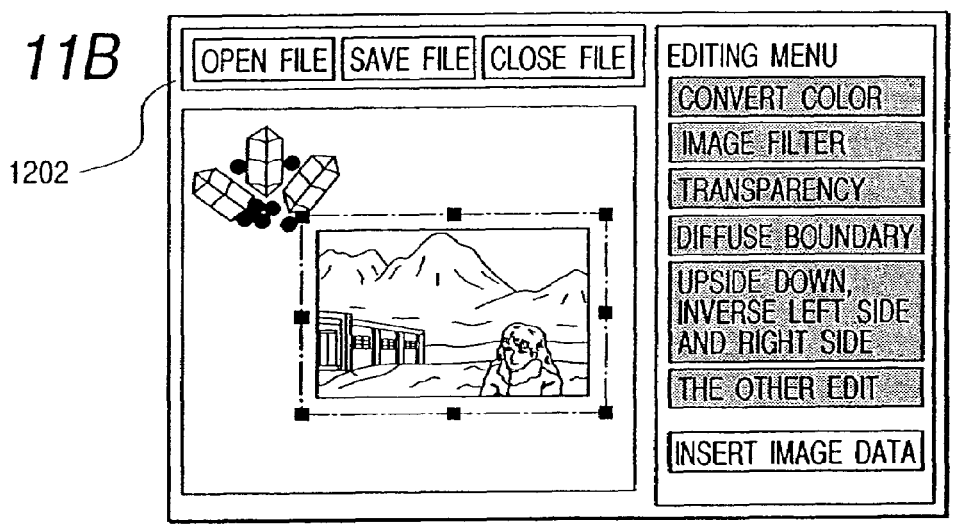
Figure 11C:
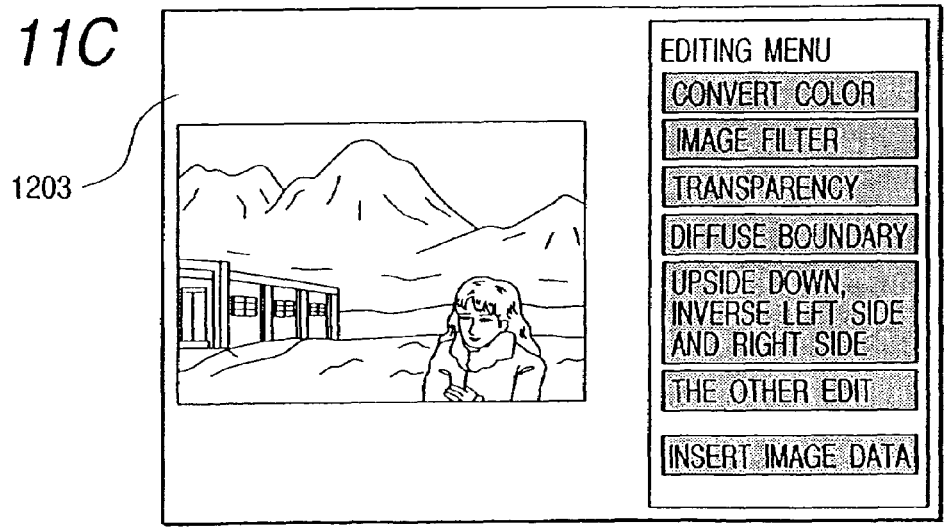

FIGS. 11A to 11C show examples of a display screen on CRT 1006 given by the display means 107 to show the state of the data processing means 106 allowed to process the image data. In the description of FIGS. 11A to 11C, using the data processing means 106 by an operator is called an application in order to collectively designate all the data analysis means 104, control means 105, data processing means 106 and display means 107.

In FIGS. 11A to 11C, reference numerals 1201, 1202 and 1203 represent application display screens of the embodiment given by the display means 107. In FIGS. 11A to 11C, the application display screen 1201 shows processed image data with the first level image data control information, the application display screen 1202 shows processed image data with the second level image data control information, and the application display screen 1203 shows processed image data with the third level image data control information.

Reference numeral 1204 represents an editing area in the application screen of the embodiment. In this editing area, image data is edited such as synthesis and superposition through external input operations using the keyboard 1008 or pointing device 1009 or through use of an editing menu to be described later. The display means 107 is instructed to display the edited image data with a text if necessary. In the application display screen 1203, only the original image data is displayed in the editing field 1204 because all editing operations are inhibited.

Reference numeral 1205 represents a guide line indicating image data in the editing area 1204 and the state that the image data is selected. In the application of this embodiment, it is assumed that the guide line 1205 is displayed when the image in the editing field is selected and that it is erased when selection of the image is released.

Reference numeral 1206 represents a selection menu for file input/output in the application of the embodiment. A document file to be displayed in the editing area 1204 can be opened, saved or closed by selecting the menu with the pointing device 1009.

Reference numeral 1207 represents an editing menu for designating an editing operation for the application of the embodiment. By selecting the menu 1207 for the image selected in the editing area 1204, the selected editing operation is performed. In the case of a "insert image data" menu, this operation can be performed even if there is no image data selected in the editing area 1204.

Next, with reference to FIGS. 11A to 11C and FIG. 10, an operation of processing image data having image data control information at each level will be described.

The application display screen 1201 is provided when image data having image data control information at the first level is to be processed, i.e., when image data capable of being edited freely is to be processed. When the image data with the first level inhibition is selected in the editing area 1204, an editing start of the image data is instructed and the guide line 1205 is displayed around the displayed image, at Step S1101.

Next, at Steps S1102 and S1103 in the flow chart shown in FIG. 10, the image data control information and corresponding inhibition functions are extracted from the image data file, thereafter at Step S1104 the inhibition functions are set, and at Step S1105 the contents of the inhibition functions are displayed by the display means 107 to change the display type of each inhibition function in the editing menu 1207. In the application display screen 1201, since the image data without any inhibition function is processed, the display style of the editing menu 1207 is not changed.

The application display screen 1202 is provided when image data having image data control information at the second level is to be processed, i.e., when image data with restricted editing operations including color conversion, image filer and the like described earlier is to be processed. Also in this case, with the processes at Steps S1101 to S1105, the inhibition functions are displayed by the display means 107 similar to the application display screen 1201.

In the application display screen 1202, several inhibition functions of the editing menu 1207 are designated so that these functions are displayed in a different display type such as a grey-out display style by the display means 107, in order to discriminate between enabled inhibition functions and disabled inhibition functions.

The application display screen 1203 is provided when image data having image data control information at the third level is to be processed, i.e., when image data with all editing operations being inhibited is to be processed. Also in this case, with the processes at Steps S1101 to S1105, the inhibition functions are displayed by the display means 107 similar to the application display screen 1201.

In the application display screen 1203, since all inhibition functions of the editing menu 1207 are designated, all the functions are displayed in a different display style such as a grey-out display style by the display means 107, in order to discriminate between enabled inhibition functions and disabled inhibition functions.

In the application display screens 1202 and 1203, the editing inhibition functions such as color conversion cannot be designated so that the image data can be prevented from being edited by the editing inhibition functions. The display style to be changed by the display means is not limited only to the above-described display style, but other display styles may be adopted such as a change in color or brightness and blinking.

Second Embodiment

A second embodiment of the invention will be described next. In the second embodiment, in addition to the notice of the inhibition functions shown in FIG. 11A to 11C of the first embodiment, a notice of inhibition functions is given to an operator more clearly or definitely by the display means 107. This method will be described in the following.

Figure 12:
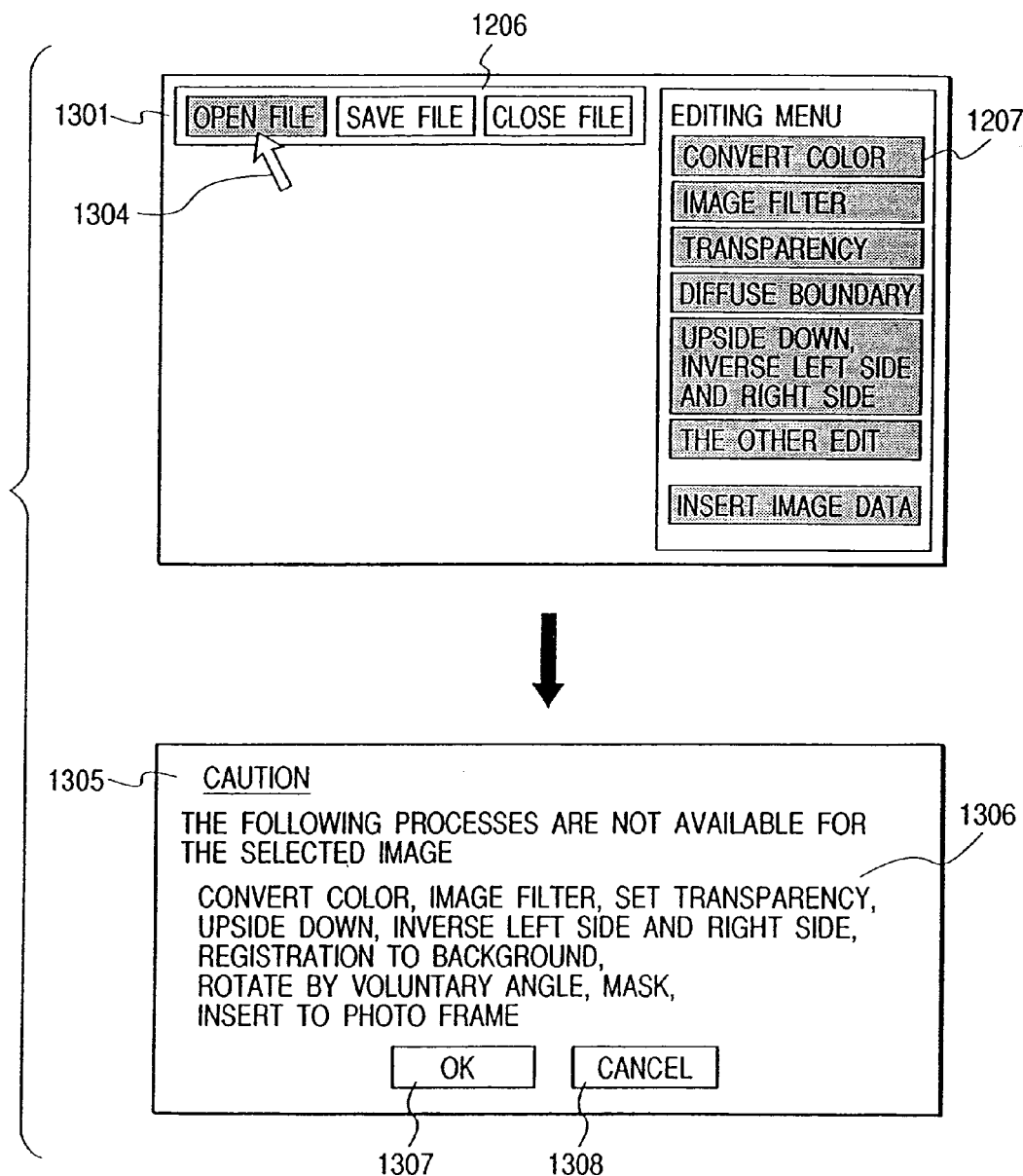
FIG. 12 shows an example of a regulation notice for an image provided with image control information, according to a second embodiment of the invention.

Referring to FIG. 12, reference numeral 1301 represents an example of an application display screen of the embodiment. This application display screen 1301 is displayed before the application display screens 1201, 1202 and 1203 shown in FIGS. 11A to 11C are displayed. Also in the following description, using the data processing means 106 by an operator is called an application in order to collectively designate all the data analysis means 104, control means 105, data processing means 106 and display means 107.

Reference numeral 1206 represents a selection menu similar to the selection menu 1206 shown in FIGS. 11A to 11C. The selection menu 1206 of this embodiment is used for file input/output by the application of the embodiment. A document file can be opened, saved or closed by selecting the menu with the pointing device 1009.

Reference numeral 1207 represents an editing menu similar to the editing menu 1207 shown in FIGS. 11A to 11C. This editing menu 1207 of the embodiment is used for designating an editing operation for the application of the embodiment. Since there is no image data to be processed, all the editing inhibition functions are enabled, for example, in a grey-out display style.

Reference numeral 1304 represents a mouse pointer displayed in association with a motion of the pointing device 1009. A process selected by the mouse pointer 1304 is executed. In the example shown in FIG. 12, a menu "open file" is selected.

Reference numeral 1305 represents a caution panel which is displayed when an image data file with image data control information is opened.

When image data with image data control information is opened, the processes at Steps S1101 to S1104 are executed so that the control means instructs the display means to display editing inhibition functions whose contents are displayed in the caution panel 1305.

In the caution panel 1305, reference numeral 1306 represents a message indicating editing inhibition functions acquired from the image data control information at each level. Reference numerals 1307 and 1308 represent a process continuance button and a process cancel button, which are selected by the pointing device to execute a corresponding process.

If an operator designates the continuance button 1307 after confirming image data control information displayed on the caution panel, the application display screen of the data processing means shown in FIGS. 11A to 11C of the first embodiment is displayed.

Third Embodiment

The third embodiment realizes an editing inhibition method different from the editing inhibition method of the first embodiment shown in FIG. 10 and FIGS. 11A to 11C with application display screens and also different from the editing inhibition method of the second embodiment shown in FIG. 12 with the application display screen.

Figure 13:
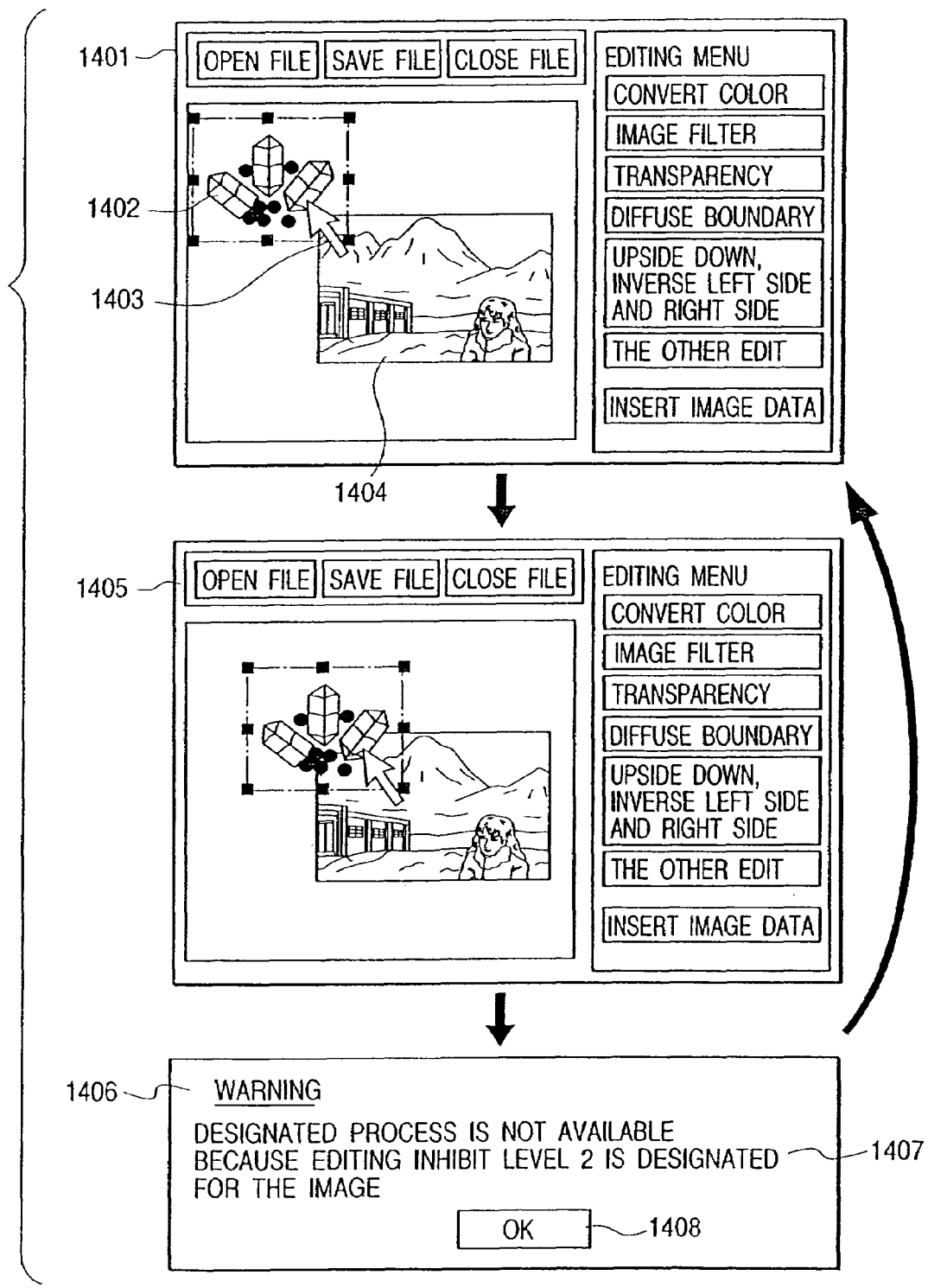
FIG. 13 is a diagram showing an example of a display screen given by the data processing means, according to a third embodiment of the invention.

The third embodiment will be described with reference to FIGS. 13 and 14 in place of FIGS. 10 to 12 of the first and second embodiments. FIG. 13 shows examples of an application display screen used for notifying an editing application of editing inhibition functions by the display means 107 of this embodiment. Also in the following description, using the data processing means 106 by an operator is called an application in order to collectively designate all the data analysis means 104, control means 105, data processing means 106 and display means 107.

Figure 14:
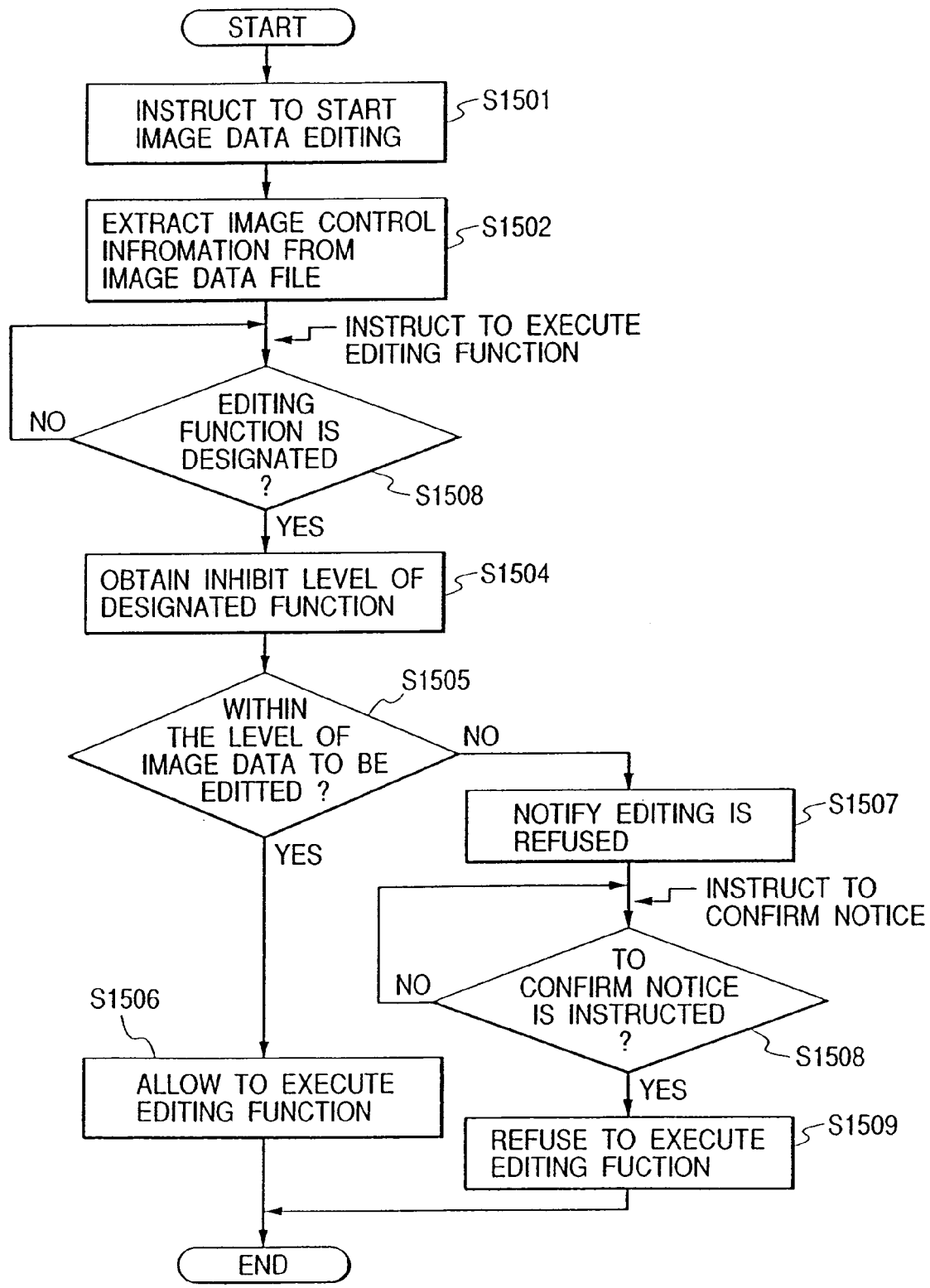
FIG. 14 is a flow chart illustrating a process to be executed by the control means, according to the third of the invention.

FIG. 14 is a flow chart illustrating the operation of the third embodiment. The flow chart shown in FIG. 10 is replaced by this flow chart of this embodiment shown in FIG. 14. The flow chart shown in FIG. 14 illustrates an operation of the data analysis means 104 to analyze the image data distributed from the data control information providing means 103 and extract the image data control information, and an operation of the control means 105 to control the data processing means in accordance with the image data control information and control the display means 107 to make it give a notice of the inhibition contents.

Referring to FIG. 13, reference numeral 1401 represents an editing application display screen of this embodiment.

Reference numeral 1402 represents an image of graphics data in the editing area. It is assumed that the graphics data is not provided with editing inhibition function. A guide line is displayed surrounding the graphics data image.

Reference numeral 1304 represents a pointing device similar to the mouse pointer 1304 shown in FIG. 12. This mouse pointer 1304 is displayed in association with a motion of the pointing device 1009. A process selected by the mouse pointer 1304 is executed.

In the example shown in FIG. 13, since the image data 1402 without image data control information at the first level is selected, the guide line is displayed surrounding the image of this image data.

Reference numeral 1404 represents an image of image data with the second level image data control information. Since the image mixture is not restricted, the image 1404 can be displayed on the same screen as that of the graphics data image 1402. In the following operation, it is assumed that the mouse pointer 1304 is moved by moving the pointing device 1009 to overlap the image 1402 on the image 1404.

Reference numeral 1405 represents a display screen in which this motion process is executed. The image 1402 is overlapped with the image 1404 of image data with the image data control information. Since an editing operation of "upper or lower of overlaps" is executed, the process at Steps S1101 to S1104 are executed to notify the display means of the editing inhibition function and display the contents of the editing inhibition function on a caution panel 1406.

In the caution panel 1406, reference numeral 1407 represents a message indicating the caution contents acquired from the image data control information at each level (in this example, the second level). Reference numerals 1408 represents a confirmation button which is selected by the pointing device 1009 to terminate the display of the caution panel and restores the screen 1401 before the graphics data image 1402 was moved.

Next, with reference to FIGS. 1, 2, 7, 13 and 14, the operation of this embodiment will be described in correspondence with display screens to be used.

First, at Step S1501 an operator instructs an application to start editing image data 1404 displayed in the editing area of the display screen 1401.

Next, at Step S1502 the data analysis means 104 extracts the image data control information provided to the image data 1404. The extracted image data control information is transferred to the control means 104 which stores the supplied image data control information in a memory such as RAM 1002.

The image data is transferred to the data processing means 106. The display means 107 is instructed to display the display screen 1401 on CRT 1006.

Next, at Step S1503 it is checked whether an operator instructs the application to execute an editing function for the image data 1404. When the editing function is instructed to be executed and the control means 105 is notified to such effect, the flow advances to Step S1504. In the example of the display screen 1405 shown in FIG. 13, when the "upper or lower of overlaps" function for the image data 1404 is instructed to be executed, the flow advances to Step S1504.

Next, at Step S1505 the control means 105 acquires the editing inhibition level of the designated function from the control data shown in FIG. 7. In order to acquire the editing inhibition level of the "upper or lower of overlaps" function shown in FIG. 13, the "upper and lower of overlaps" function is searched from the function group at each level and the editing inhibition level to which the searched group belongs is acquired. In this embodiment, the second level is acquired to restrict the function at the second level.

At Step S1506 the image data control information extracted at Step S1502 and stored in RAM 1002 is compared with the editing inhibition level acquired at Step S1505, to thereby judge whether the function can be allowed to be executed. The "upper or lower of overlaps" function is a function to be restricted at the second level. Since the image data 1404 is provided with the second level editing inhibition information, this function is not allowed to be executed.

Regarding the function permitted at Step S1506, a permission is notified from the control means 105 to the data processing means 106 at Step S1507. The data processing means 106 then executes the permitted function.

If it is judged at Step S1506 that the function is not permitted to be executed, the flow advances to Step S1508 whereat the control means 105 notifies the display means of the editing inhibition function and instructs the display means 107 to display the caution panel 1406 indicating an execution inhibition. Upon reception of this notice, the display means 107 displays the caution panel 1406.

At Step S1509, the operator confirms this caution panel 1406 and notifies this confirmation by using the confirmation button 1408. Upon reception of this confirmation by the control means 105, the flow advances to Step S1510.

At Step S1510, the control means 105 notifies the data processing means 106 of execution inhibition. Upon reception of this execution inhibition, the data processing means 106 terminates a motion process for the image data 1402. The display means 107 is instructed to recover the display screen 1401 and display it on CRT 1006.

With the above operations, a notice of an editing inhibition function and an execution inhibition are realized in accordance with the image data control information. As compared to the first and second embodiments, the third embodiment can effectively restrict a function which is additionally generated when the pointing device 1009 instructs to execute some function without using the editing menu or when a function is executed for image data without editing inhibition function or at a low level.

Fourth Embodiment

The fourth embodiment realizes the editing inhibition by a combination of the first and third embodiments. Namely, the fourth embodiment realizes both preliminary restriction by using the editing menu and restriction based upon image data control information when an editing function is instructed to be executed and this instruction is judged to be permitted or not.

Fifth Embodiment

The fifth embodiment realizes the editing inhibition by a combination of the second and third embodiments. Namely, the fifth embodiment realizes both the functions of the fourth embodiment and the function of notifying an editing inhibition function by using the caution panel before the editing operation starts.

Sixth Embodiment

In the sixth embodiment, image data control information is used which is different from the image data control information shown in FIG. 7 and used for restricting the editing operation of the image data processing apparatus of the first to fifth embodiments.

The control data different from that shown in FIG. 7 will be described with reference to FIG. 15. The control data of this embodiment shown in FIG. 15 is used for restricting the editing operation of the image data processing apparatus in accordance with the editing inhibition information.

Each of this image data control information is given an editing level. This editing level may be an editing inhibition level or an editing permission level. In this embodiment, the editing permission level is used.

A method of acquiring the editing inhibition level of each editing function at Step S1103 shown in FIG. 10 and at Step S1504 shown in FIG. 14 will be described by using the control data shown in FIG. 15.

At Step S1103 shown in FIGS. 11A to 11C, the editing levels of all the editing inhibition functions are checked to extract the editing inhibition functions having the editing inhibition level lower than that of the image data to be processed. For example, if image data has the second editing inhibition level, the editing functions having the lower level, i.e., first level are extracted. If image data has the third editing inhibition level, the editing functions having the first and second levels are extracted.

At Step S1504 shown in FIG. 14, since the single editing function is acquired, the editing function of each image data control information is sequentially searched and when the subject editing function is searched, the inhibition level given to the searched editing function is acquired.

The editing level detected at Step S1504 shown in FIG. 15 is expressed by the editing permission level. Therefore, at Step S1505 whereat the inhibition level of image data is compared, this comparison is performed by an inverse logic of that used by the sixth embodiment. Namely, in the sixth embodiment, the editing function having the inhibition level equal to or larger than that of the image data is not permitted to be executed, whereas in the sixth embodiment the editing function having the editing level equal to or larger than that of image data is permitted to be executed.

Even if the control data shown in FIG. 15 is used, the editing function can be inhibited in accordance with the image data control information, similar to the first to fifth embodiments using the control data shown in FIG. 7.

Seventh Embodiment

In the seventh embodiment, an image data distribution computer for distributing stored image data and an image data processing computer for performing editing, printing and the like of image data are used in addition to the structure of each of the first to sixth embodiments.

In the seventh embodiment, a plurality of image data distribution computers and image data processing computers may be used. Also in the seventh embodiment, computers are not interconnected by a network.

The seventh embodiment will be described with reference to the functional block diagram shown in FIG. 16 in place of the block diagram of FIG. 2 used for the description of the first to sixth embodiments.

The structure of the sixth embodiment will be first described with reference to FIG. 16. FIG. 16 is a functional block diagram of the sixth embodiment using a plurality of computers, to be replaced by the block diagram shown in FIG. 2 used for the first to sixth embodiments.

Figure 16:
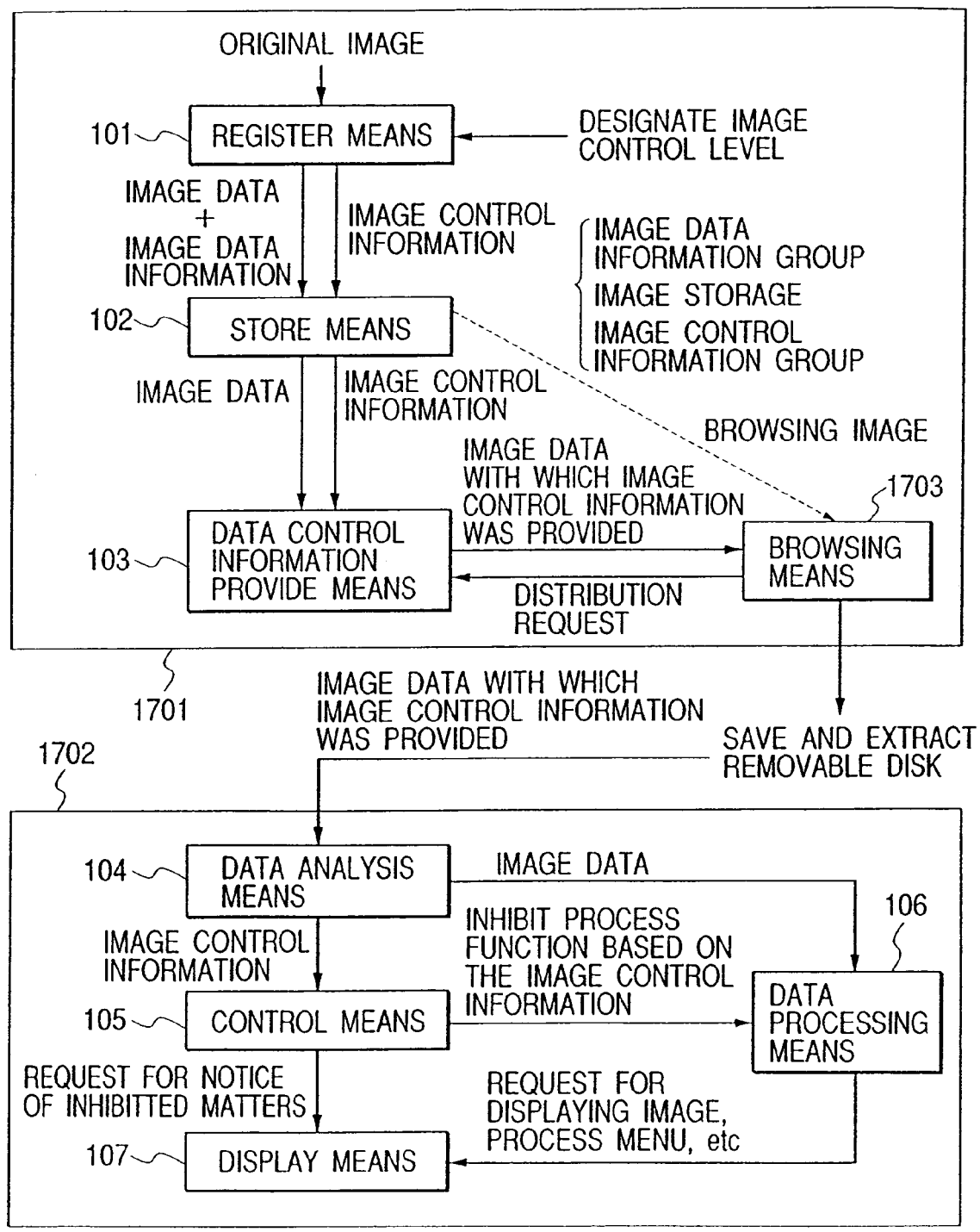
FIG. 16 shows a module structure to be used in a seventh embodiment of the invention.

In FIG. 16, reference numeral 1701 represents an image data distribution computer including an image supplying apparatus of the invention which computer stores image data and corresponding image data control information and distributes the stored image data.

Reference numeral 1702 represents an image data processing computer including an image data processing apparatus of the invention which computer performs editing, printing and the like of image data.

Reference numeral 101 represents a registration means similar to the registration means 101 shown in FIG. 2, which registers image data in a storage means 102.

The storage means 102 is similar to the storage means 102 shown in FIG. 2 and stores image data and corresponding image data control information. Reference numeral 103 represents a data control information providing means similar to the data control information providing means 103 shown in FIG. 2, which means in response to a data distribution request from a browsing means 1703 acquires image data and corresponding image data control information stored in the storage means 1702 and adds the image data control information to the image data to transfer it to the browsing means 1703.

The browsing means 1703 is used for browsing image data stored in the storage means 102 of the image data distribution computer 1701. An operator instructs the browsing means 1703 to browse the image data stored in the storage means 102, and if a desired image to be processed at the image data processing computer is found, the operator issues a distribution request for the image data to an image data control information providing means 103. The operator receives the image data with the image data control information and writes it in a removable disk such as a floppy disk and a CD-ROM by using a removable disk drive 1011, in order to use later the stored image data at the image data processing computer.

Reference numeral 104 represents a data analysis means similar to the data analysis means 104 shown in FIG. 2, which means is installed in the data processing computer. The data analysis means 104 reads image data from the hard disk drive 1010 or removable disk drive 1011, extracts the image data control information from the image data already provided with the image data control information, and passes it to a control means 105.

The control means 105 is similar to the control means 105 shown in FIG. 2, and controls a data processing means 106 and a display means 107 in accordance with the image data control information extracted by the data analysis means 104.

The data processing means 106 is similar to the data processing means 106 shown in FIG. 2, and processes image data for data editing, printing and the like, or temporarily stores the image data for preparing for such data processing.

The display means 107 is similar to the display means 107 shown in FIG. 2, and displays information requested by the data processing means 106 and control means 105. The registration means 101, image data control information providing means 103 and browsing means 1703 are constituted of programs to be executed at the image data distribution computer 1701, and are stored in ROM 1003 or a hard disk in HDD 1010. These programs are developed on RAM 1002 and executed. The programs may be stored in an external storage device such as a CD-ROM and read from the removable disk drive 1011, and if necessary the programs may be saved once in HDD 1010 and thereafter developed on RAM 1002.

The storage means 102 is realized by a generally used database (DB) system and constituted of programs and data. Similar to the registration means 103, these programs are stored in ROM 1003 and in a hard disk in HDD 1010 and developed on RAM 1002 to execute them.

Programs stored in an external storage device such as a CD-ROM may be read from the removable disk drive 1011, and if necessary they may be saved in a hard disk in HDD 1010 to thereafter develop them on RAM 1002 to execute them. Data to be stored in the storage means is stored in a hard disk, RAM 1002, or removable disk.

The data analysis means 104, control means 105, data processing means 106 and display means 107 are realized by programs to be executed by the image data processing computer 1702, the programs being stored in ROM 1003 or in a hard disk in HDD 1010 and developed on RAM 1002 to execute them. The programs may be stored in an external storage device such as a CD-ROM and read from the removable disk drive 1011, and if necessary they may be stored once in a hard disk in HDD 1010 to thereafter develop them on RAM 1002 to execute them.

In this embodiment, it is assumed that the data analysis means 104, control means 105, data processing means 106 and display means 107 are provided as an application including programs realizing the function of these means.

Figure 17:
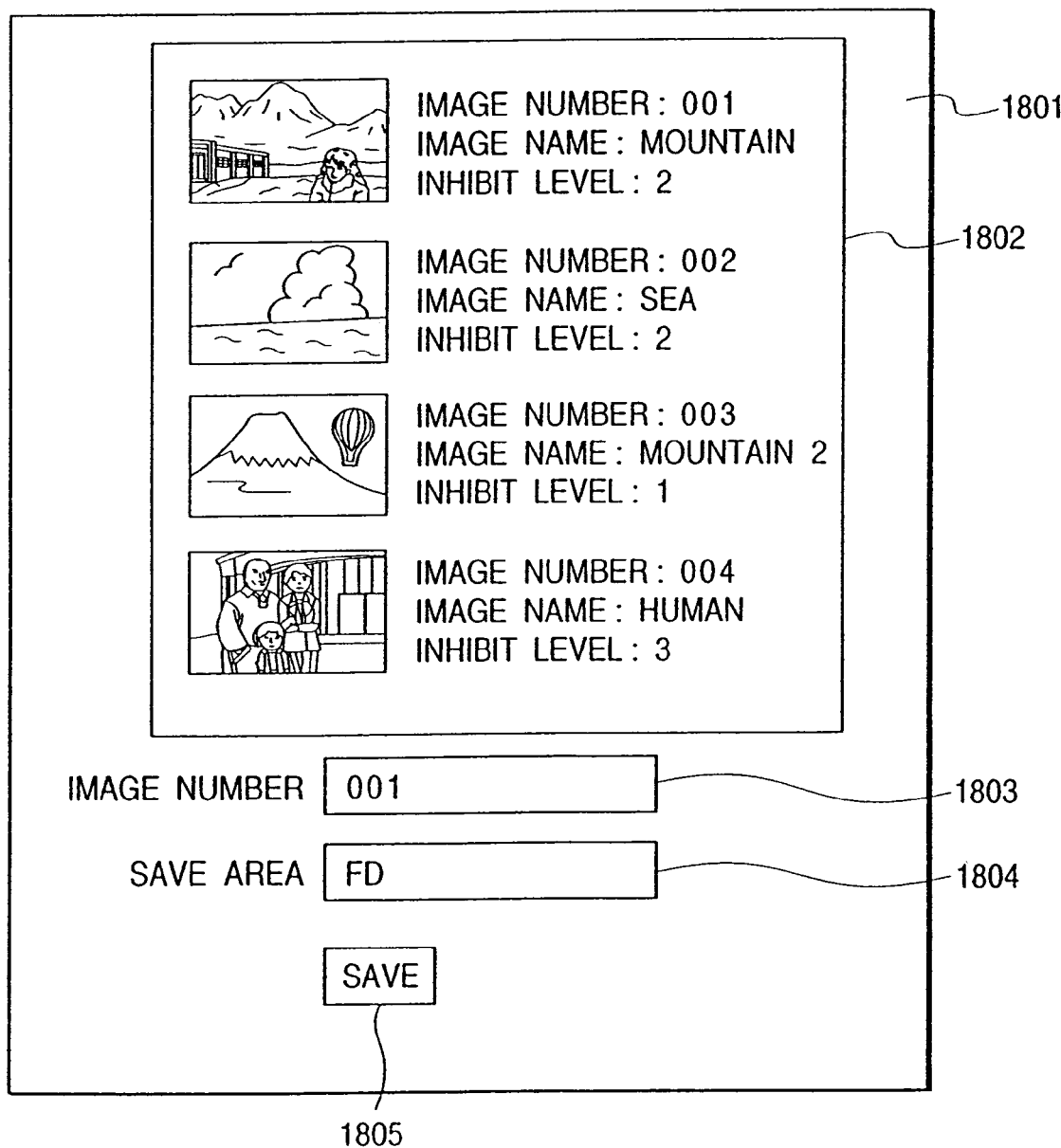
FIG. 17 is a diagram showing an example of a display screen given by a browsing means, according to the seventh embodiment and an eighth embodiments of the invention.

Next, an example of a display screen given by the browsing means 1703 will be described. Referring to FIG. 17, reference numeral 1801 represents a display screen given by the browsing means. Reference numeral 1802 represents a browsing area in which data stored in the storage means 102 is displayed. In this embodiment, image data, an image number, an image name, and image data control information are displayed.

Reference numeral 1803 represents an image number box for designating the image number of image data to be processed at the image data processing computer 1702. Reference numeral 1804 represents a save destination box for designating the save area of image data desired by an operator. Reference numeral 1805 represents a save button used for saving image data.

(Data Flow and Process)

Next, the data flow and process of this embodiment will be described with reference mainly to FIGS. 5, 11, 16 and 17. In this embodiment, a different point from the structure shown in FIG. 2 applied to the first to sixth embodiments will be described. Namely, a process of browsing image data in the storage means 102 by the browsing means 1703 and a process of fetching the image data by an application of the image data processing computer 1702 will be described.

The description is therefore given on the assumption that image data, image data control information and other information shown in FIG. 5 are already stored in the storage means 102. Since the process after the image data is acquired is similar to that of the first to sixth embodiments, the description thereof is omitted.

First, an operator activates the browsing means 1703 in order to acquire desired image data stored in the storage means 102.

As the browsing means 1703 is activated, the browsing means 1703 sequentially acquires the records of the image data information group 601 and image data control information group 602 from the storage means 102 and corresponding image data from the image data storage 603 of the storage means 102, and displays as a preview image the acquired records and data in the browsing area 1802 together with the image number, image name and image data control information (inhibition level).

The operator browses the image data displayed in the browsing area 1802, and if desired image data is found, the image number of the desired image data is entered in the image number box 1803. Next, a save destination removable disk drive is entered in the same destination box 1804 in order to save the image data in a removable disk desired by the operator. After these designations are entered, a removable disk is set to the drive designated in the save destination box 1804 and the save button 1805 is operated to save the image data.

In response to the save instruction, the browser means 1703 transfers the image number to the image data control information providing means 103 to thereby request image data distribution. In response to the distribution request, the image data control information providing means 103 acquires the image data corresponding to the requested image number from the storage means 102 and adds the image data control information to the image data. A method of acquiring image data and adding image data control information to the image data is the same as that described with the first embodiment. The image data added with the image data control information is transferred from the image data control information providing means 103 to the browsing means 1703 whereat the image data is written in a removable disk at the drive designated in the save destination box 1804.

With the above operations, image data desired by the operator to be processed by the image data processing computer 1702 is stored in the removable disk. Next, the operator activates an application of the image data processing computer 1702. The operator uses an "open file" menu in the selection menu 1206 or an "insert image data" menu in the editing menu 1207 of the application to write the image data.

Thereafter, a method similar to that described with the first to sixth embodiments is performed to protect the image data by using the image data control information.

Eighth Embodiment

In the eighth embodiment, a plurality of computers interconnected via a network are used in addition to the structure of each of the first to sixth embodiments.

Commuters interconnected via the network includes image data distribution computers (server computers) including an image supplying apparatus of this embodiment for storing image data and supplying the stored image data and image data processing computers (client computers) including an image data processing apparatus for performing editing, printing and the like of image data.

Figure 18:
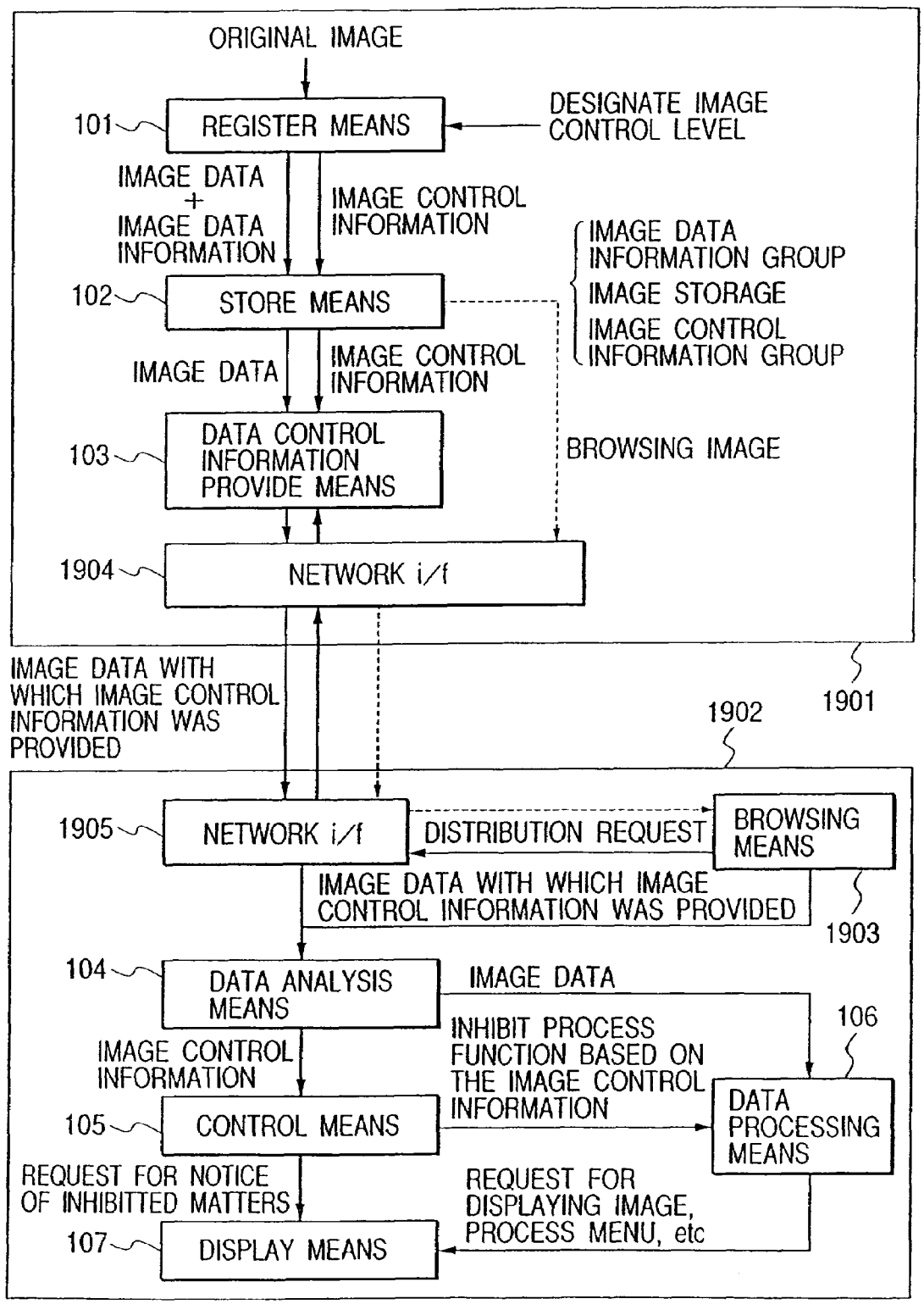
FIG. 18 shows a module structure to be used in the eighth embodiment of the invention.

FIG. 18 shows the structure of the eighth embodiment using a plurality of computers, in place of the structure of each of the first to sixth embodiments shown in FIG. 2.

In FIG. 18, reference numeral 1901 represents an image data distribution computer which stores image data and corresponding image data control information and distributes the stored image data. In this embodiment, the image data distribution computer connected to the network has as its main object supplying data, and is called a server computer.

In FIG. 18, reference numeral 1902 represents an image data processing computer which performs editing, printing and the like of image data. In this embodiment, the image data processing computer has as its main object processing image data supplied from an operator including data supplied from the server computer, and is called a client computer.

Reference numeral 101 represents a registration means similar to the registration means 101 shown in FIG. 2, which means registers image data in a storage means 102.

The storage means 102 is similar to the storage means 102 shown in FIG. 2 which means stores image data and corresponding image data control information.

Reference numeral 103 represents a data control information providing means similar to the data control information providing means 103 shown in FIG. 2, which means in response to a data distribution request supplied via the network from a browsing means 1903 of the client computer, acquires image data and corresponding image data control information stored in the storage means 1902 and adds the image data control information to the image data.

The browsing means 1703 is used for browsing image data stored in the storage means 102 of the image data distribution computer 1901. An operator instructs the browsing means 1903 to browse the image data stored in the storage means 102, and if a desired image to be processed at the client computer is found, the operator issues a distribution request for the image data to an image data control information providing means 103. The image data added with the image data control information is acquired by the browsing means 1903 or by an application including a data analysis means 104, a control means 105, a data processing means 106 and a display means 107.

The data analysis means 104 is similar to the data analysis means 104 shown in FIG. 2, and is installed in the client computer. The data analysis means 104 reads image data from the hard disk drive 1010 or removable disk drive 1011, extracts the image data control information from the image data already provided with the image data control information, and passes it to the control means 105.

The control means 105 is similar to the control means 105 shown in FIG. 2, and controls the data processing means 106 and display means 107 in accordance with the image data control information extracted by the data analysis means 104.

The data processing means 106 is similar to the data processing means 106 shown in FIG. 2, and processes image data for data editing, printing and the like, or temporarily stores the image data for preparing for such data processing.

The display means 107 is similar to the display means 107 shown in FIG. 2, and displays information requested by the data processing means 106 and control means 105.

Reference numeral 1904 represents a network interface similar to the network interface 1004 shown in FIG. 1, which interface is used for the network control of connecting the server computer 1901 to the network and of transferring image data with image data control information and the like from the server computer to the network by using the storage means 102 and image data control information providing means 103.

Reference numeral 1905 represents a network interface similar to the network interface 1905 and to the network interface 1004 shown in FIG. 1, which interface is used for the network control of connecting the client computer to the network and of acquiring data on the network by the browsing means 1903 or by an application including the data analysis means 102, control means 1903, image data processing means 1903 and display means 104.

The registration means 101 and image data control information providing means 103 are constituted of programs to be executed at the server computer 1901, and are stored in ROM 1003 or a hard disk in HDD 1010. These programs are developed on RAM 1002 and executed. The programs may be stored in an external storage device such as a CD-ROM and read from the removable disk drive 1011, and if necessary the programs may be saved once in HDD 1010 and thereafter developed on RAM 1002.

The storage means 102 is realized by a generally used database (DB) system and constituted of programs and data. Similar to the registration means 103, these programs are stored in ROM 1003 and in a hard disk in HDD 1010 and developed on RAM 1002 to execute them. Programs stored in an external storage device such as a CD-ROM may be read from the removable disk drive 1011, and if necessary they may be saved once in a hard disk in HDD 1010 to thereafter develop them on RAM 1002 to execute them. Data to be stored in the storage means is stored in a hard disk, RAM 1002, or removable disk.

The browsing means 1903, data analysis means 104, control means 105, data processing means 106 and display means 107 are realized by programs to be executed by the client computer 1902, the programs being stored in ROM 1003 or in a hard disk in HDD 1010 and developed on RAM 1002 to execute them. The programs may be stored in an external storage device such as a CD-ROM and read from the removable disk drive 1011, and if necessary they may be stored once in a hard disk in HDD 1010 to thereafter develop them on RAM 1002 to execute them.

In this embodiment, it is assumed that the browsing means 1903 is a generally used network browser and a function not provided with such a browser is realized by using an expansion means (plug-in) of such a browser. A function expansion is generally used by the browser and the detailed description thereof is omitted. It is also assumed that the data analysis means 104, control means 105, data processing means 106 and display means 107 are provided as an application including programs realizing the function of these means.

(Data Flow and Process)

Next, the data flow and process of this embodiment will be described with reference mainly to FIGS. 5, 11A to 11C, 17 and 18. In this embodiment, a different point from the structure shown in FIG. 2 applied to the first to sixth embodiments will be described. Namely, a process of browsing image data in the storage means 102 of the server computer 1901 by the browsing means 1703 via the network and a process of fetching the image data by an application of the client computer will be described.

The description is therefore given on the assumption that image data, image data control information and other information shown in FIG. 5 are already stored in the storage means 102. Since the process after the image data is acquired is similar to that of the first to sixth embodiments, the description thereof is omitted.

First, an operator activates the browsing means 1703 by using the client computer 1902 in order to acquire desired image data stored in the storage means 102 of the server computer 1901.

An application display screen given by the browsing means 1903 of this embodiment is similar to that given by the browsing means 1703 of the eighth embodiment. In this case, the save destination box 1804 may be omitted because the save destination is apparently the client computer itself which activated the browsing means 1903. In this embodiment, therefore, the description is made on the assumption that the save destination box 1804 is omitted.

As the browsing means 1903 is activated, the browsing means 1903 sequentially acquires via the network interfaces 1904 and 1905 the records of the image data information group 601 and image data control information group 602 from the storage means 102 and corresponding image data from the image data storage 603 of the storage means 102, and displays as a preview image the acquired records and data in the browsing area 1802 together with the image number, image name and image data control information (inhibition level).

The operator browses the image data displayed in the browsing area 1802, and if desired image data is found, the image number of the desired image data is entered in the image number box 1803. Thereafter, the save button 1805 is operated to save the image data.

In response to the save instruction, the browser means 1903 transfers the image number to the image data control information providing means 103 to thereby request image data distribution. In response to the distribution request, the image data control information providing means 103 acquires the image data corresponding to the requested image number from the storage means 102 and adds the image data control information to the image data. A method of acquiring image data and adding image data control information to the image data is the same as that described with the first embodiment.

When the image data added with the image data control information is generated, a preparation completion notice as well as a path to the image data file is transferred from the image data control information providing means 103 to the browsing means 1903.

Upon reception of the preparation completion notice, if the browsing means 1903 itself operates to save the image data in the client computer, then the browsing means 1903 acquires the image data with the image data control information from the server computer and writes it in HDD 1010 or the like.

In this case, if an application has a temporarily storage function such as an electronic album which facilitates the application to process image data, or if a client application has a temporarily storage function of an image data for the application, then this application is instructed to temporarily store the image data at the client computer 1902.

If the application acquires the image data from the server computer 1901, the application is instructed to acquire the image data together with a path to the image data file when the preparation completion notice is received from the image data control information providing means 103 at the browsing means.

In response to the acquisition instruction, the application acquires the image data from the server computer 1901 and writes it in HDD 1010 or the like. In this case, if an application has a temporarily storage function such as an electronic album which facilitates the application to process image data, then this application is instructed to temporarily store the image data at the client computer 1902. With the above processes, the operator can store desired image data at the client computer 1902.

Next, the operator activates an application of the image data processing computer 1902. The operator uses an "open file" menu in the selection menu 1206 or an "insert image data" menu in the editing menu 1207 of the application to write the image data. If the application has a temporary storage function, the image data is acquired from image data under management of the temporary storage function, whereas if the application has no temporary storage function, the image data is acquired from image data under file management provided by an operating system (OS).

With the above processes, the client computer acquires image data with image data control information from the server computer connected to the network, and the acquired image data can be processed in accordance with the image data control information so as to protect the right of the image data provider.

Ninth Embodiment

The ninth embodiment is applied to audio data of the SMF format in place of the JFIF format of image data.

The SMF format defines track chunks which are used for various data fields. A data section in the track chunk has data sets including a meta event such as a text field in which text data is written. In the ninth embodiment, the data control information having a plurality of inhibition levels is embedded in the text field or a copyright indication field of the meta event.

The registration means 101 resisters audio data and corresponding audio data control information. The storage means 102 stores and manages the audio data and corresponding audio data control information. The data control information providing means 103 embeds the audio data control information in the text field of the meta event field of the audio data SMF format. The data analysis means 104 extracts the audio data control information from the audio data and passes it to the control means 105. The control means 105 restricts the process function of the data processing means 106 in accordance with the audio data control information.

In this embodiment, the following inhibition levels are given to the audio data control information.

First level: free editing (audio data can be wholly edited),

Second level: partial editing (audio data can be partially edited),

Third level: no editing (reproduction only).

The data processing means 106 has an editing function restricted in accordance with each inhibition level. For example, at the third level, all the functions except the reproduction function are restricted. At the second level, an editing operation is partially restricted by inhibiting a function of selecting audio data partially and arbitrarily.

At the first level, no editing operation is inhibited. In response to an audio data editing start instruction, the display means 107 notifies the inhibition contents to thereby make a disabled indication of the editing inhibition function of the data processing means 106. If an instruction to execute the editing inhibition operation is issued, the display means 107 makes a notice of inhibition be displayed on the caution panel. As described above, the invention is also applicable to audio data.

Tenth Embodiment

The tenth embodiment is applied to moving image data of the moving image data format using MPEG (hereinafter called a MPEG file format) in place of the JFIF format of image data.

In the tenth embodiment, the data control information having a plurality of inhibition levels is embedded in the field (hereinafter called a data control information embedding field) similar to the copyright field or text field of the SMF format for audio data or in a comment field of the JFIF format for image data.

The registration means 101 resisters moving image data and corresponding moving image data control information. The storage means 102 stores and manages the moving image data and corresponding moving image data control information.

The data control information providing means 103 embeds the moving image data control information in the data control information embedding field of the MPEG format. The data analysis means 104 extracts the moving image data control information from the moving image data and passes it to the control means 105. The control means 105 restricts the process function of the data processing means 106 in accordance with the moving image data control information.

In this embodiment, the following inhibition levels are given to the moving image data control information.

First level: free editing (moving image data can be wholly edited),

Second level: partial editing (moving image can be partially edited),

Third level: no editing (reproduction only).

The data processing means 106 has an editing function restricted in accordance with each inhibition level. For example, at the third level, all the functions except the reproduction function are restricted. At the second level, an editing operation is partially restricted by inhibiting a function of selecting moving image data partially and arbitrarily. At the first level, no editing operation is inhibited.

In response to a moving image data editing start instruction, the display means 107 notifies the inhibition contents, e.g., direct display of contents, display of predetermined marks, a partial change in color, luminance or the like to thereby make a disabled indication of the editing inhibition function of the data processing means 106. If an instruction to execute the editing inhibition operation is issued, the display means 107 makes a notice of inhibition be displayed on the caution panel. As described above, the invention is also applicable to moving image data.

Other Embodiments

The present invention may be applied to a system constituted of a plurality of apparatuses (e.g., a host computer, interface units, a reader, a printer, and the like) or to a system constituted of a single apparatus.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention. The storage medium storing such program codes may be a floppy disk, a hard disk, an optical disk, a magneto-optical disk, a CD-ROM, a magnetic tape, a non-volatile memory card, a ROM, and the like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As described so far, according to the invention, data control information to be used for restricting various process functions is added to data, and the operation of the data processing means for performing various processes is restricted in accordance with the data control information. Accordingly, the operation of the data processing means can be restricted in accordance with an inhibition level of the data control information. Restriction matching an intention of a creative data provider can be performed finely. For example, in accordance with image data control information, an editing operation, print size, degree of commercial use and the like respectively of image data can be restricted, and an intention of an image data provider can be reflected correctly.

According to another aspect of the invention, such fine restriction can be realized without unnecessarily restricting a data user, and in addition, a restriction given to data can be explicitly notified by changing a display of inhibition contents.

Next, with reference to FIG. 19, another example of a process of managing data control information and distributing data when a distribution request for the data is issued, will be described. This example is a modification of the first embodiment illustrated in FIG. 9. In this modification, data control information is distributed in response to a request issued after data distribution, and only the information indicating a presence of control information is distributed together with the data.

Figure 19:
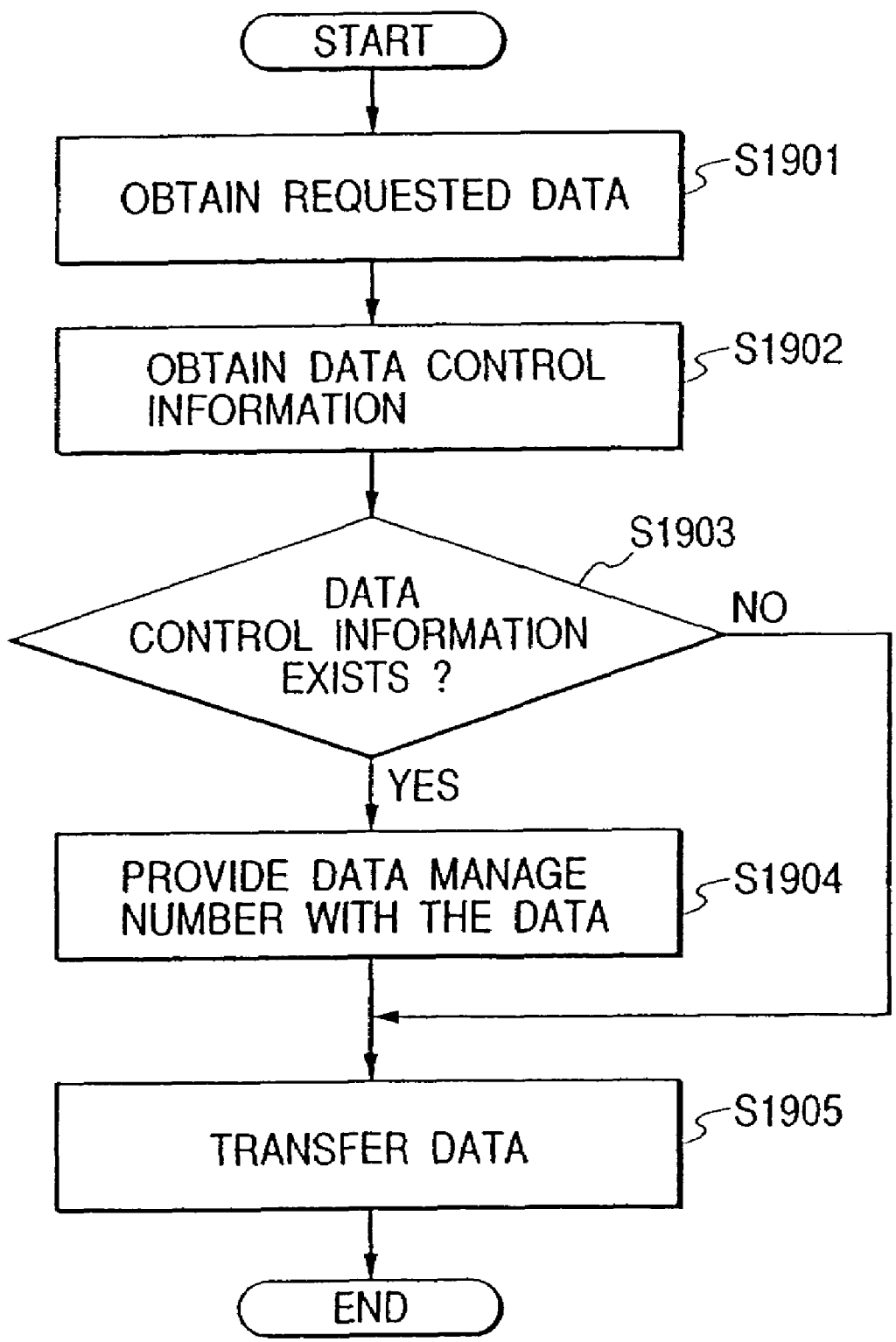
FIG. 19 is a flow chart illustrating a process to be executed by a data control information managing means when the invention is applied to image data.

FIG. 19 is a flow chart illustrating a process to be executed by a data control information managing means 103 (corresponding to the data control information providing means 103 of the first embodiment shown in FIG. 2) to manage data control information and distribute the data.

In the following description, it is assumed that a distribution request is issued to the data control information management means 103 when an operator desires editing, printing and the like of data stored in the storage means 102.

At Step S1901 upon reception of the distribution request, the data control information management means 103 acquires requested data from the storage means 102. In acquiring the data, a record corresponding to the desired image data is searched from the image data information group 601 stored in the storage means 102, and the image data file having the file name stored in the image data file name 605 in the corresponding member is read from the image data storage 603.

Next, at Step S1902 the data control information management means 103 searches the image data control information group 602 stored in the storage means 102 and acquires the image data control information of the desired image data. Searches at Steps S1901 and S1902 are realized by a general search method because the storage means 102 is constituted of a general DB system. The detailed description of search is therefore omitted.

Next, at Step S1903 it is checked whether the data control information exists at the search at Step S1902. If exists, at Step S1904 a management number used by the storage means 102 is added to the data as a data management number. If not exists at Step S1903, it is not necessary for the data control information management means 103 to manage the data control information, and the flow advances to Step S1905 whereat the data is transferred.

Next, with reference to FIG. 20, an example of a process to be executed by the control means 105 to control the data processing means 106 in accordance with the image data control information and to control the display means 107 to make it give a notice to an operator, will be described. This example corresponding to a modification of the first embodiment illustrated in FIG. 10. In this modification, a process to be executed by the control means 105 to suppress in advance the functions of the data processing means 106 will be described.

Figure 20:
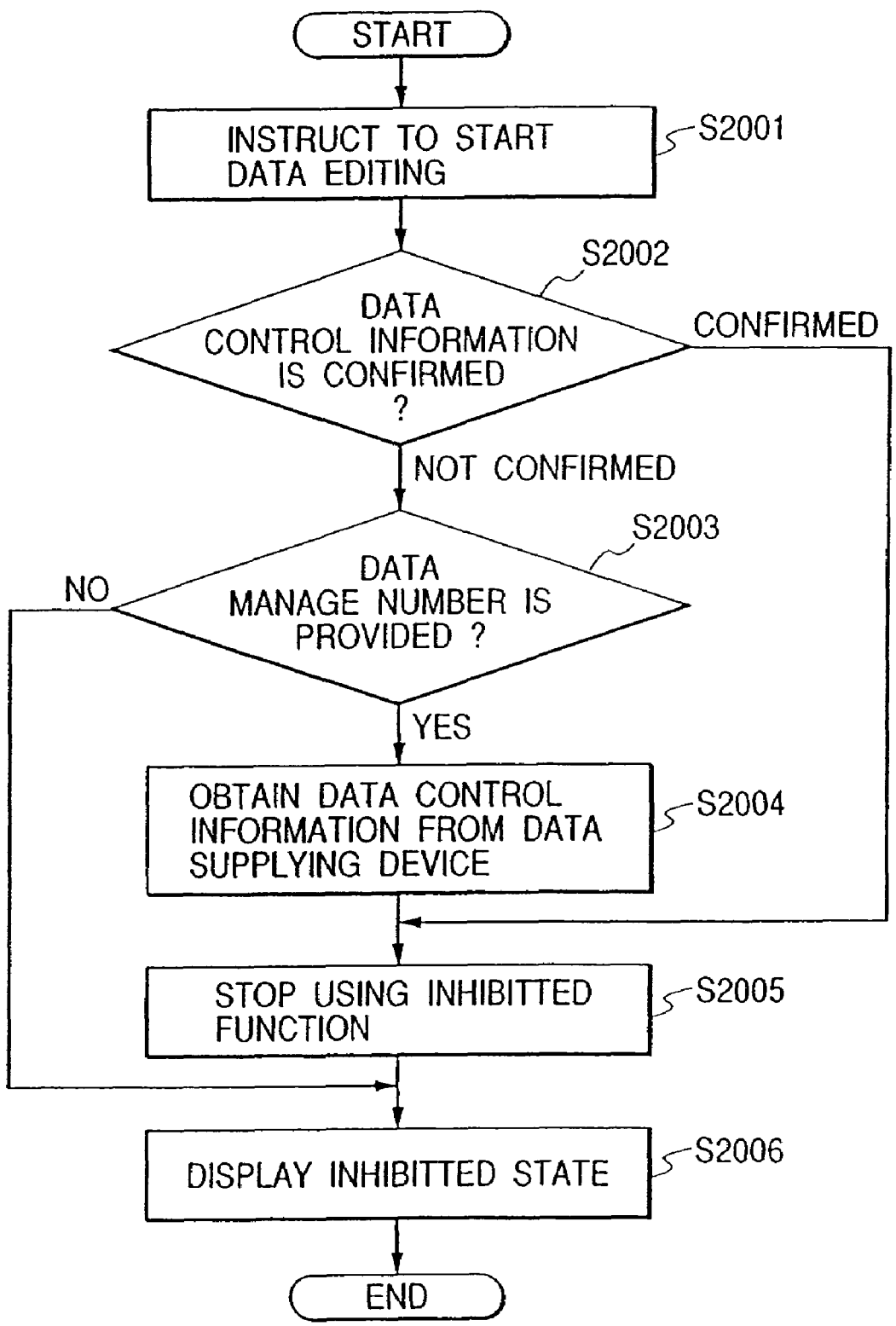
FIG. 20 is a flow chart illustrating a process to be executed by the control means.

FIG. 20 is a flow chart illustrating an operation to be executed when the data distributed from the data control information management means 103 has the data management number, i.e., when the data is required to be restricted in accordance with the data control information (when the control information exists), wherein the data control information management means 103 acquires the data control information, and in accordance with this control information, the control means 105 controls the data processing means 106 and controls the display means 107 to make it give a notice of the inhibition contents.

A series of processes to be described with this flow chart is assumed that the data processing means 106 is already activated because the processes are performed as a preliminary process of the data processing means 106 when an operator instructs the data processing means 106 to start image data processing such as editing and printing.

Referring to FIG. 20, first at Step S2001 an operator instructs the data processing means 106 to edit the data. At Step S2002 a data management means 104 (corresponding to the data analysis means 104 of the first embodiment in FIG. 2) confirms whether the data file instructed to be edited at Step S2001 contains the data control information.

If the data management means 104 cannot confirm a presence of data control information, the flow advances to Step S2003, whereas if confirmed, the data is transferred to the control means 105. In this modification, a presence of data control information can be confirmed from a presence of the data management number added to the identifier in the comment field of the data as illustrated in FIG. 19. At Step S2003 it is checked whether the identifier exists in the data file, and if exists the data management number is extracted.

If the identifier does not exist, it is judged that the data control information does not exist, to follow Step S2006. If the data management number exists, then at Step S2004 the data management means 104 supplies a data control information acquisition request and the data management number acquired at Step S2003 to the data control information management means 103 so as to acquire the data control information from the data control information management means 103.

At Step S2005, in accordance with the image data control information acquired at Step S2004, the control means 105 acquires the editing function to be inhibited from the control data shown in FIG. 7 in order to suppress the editing function of the data processing means 106. For example, if the image data control information extracted at Step S2004 is the editing inhibition first level which has no editing inhibition, there is no control data to be acquired, whereas if it is the second level, the control data at the second level is acquired, and if it is the third level, the control data at the second and third levels is acquired.

Next, at Step S2005 the control means 105 notifies the data processing means 106 of the inhibition function acquired at Step S2004 to inhibit to use the function. At Step S2006 the control means 105 instructs the display means 107 to display a notice of the inhibition function acquired at Step S2004 or instructs the display means 107 to display information on the data processing means 106 with the inhibition function acquired at Step S2005. If it is confirmed at Steps S2002 and S2003 that the data control information does not exist, then the inhibition process is not performed.

When the process of the flow chart shown in FIG. 20 is completed, the data processing means 106 is enabled to process the image data.

Eleventh Embodiment

Next, an eleventh embodiment of the invention will be described.

In this embodiment, creative or original data is prevented from being edited illegally by a data processing apparatus. The system configuration, hardware, function realizing means and methods are the same as those of the above-described embodiment. In the following description, different points from the modifications of the first embodiment described with FIGS. 19 and 20 will be described.

Figure 21:
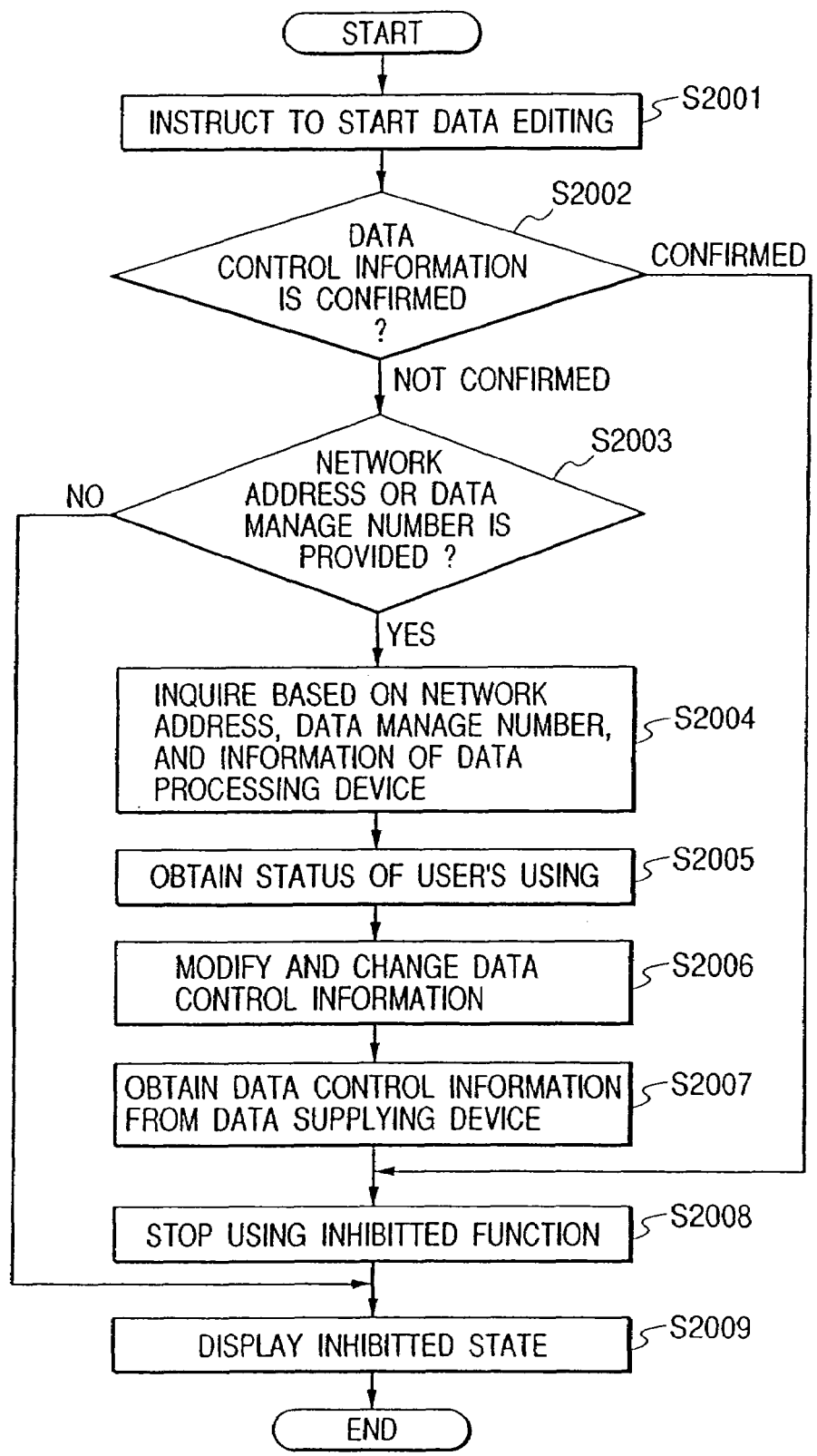
FIG. 21 is a flow chart illustrating a process to be executed by the control means according to an eleventh embodiment of the invention.

FIG. 21 is a flow chart illustrating the process to be executed by the eleventh embodiment. In this process, if the data distributed from the data control information management means 103 is required to be restricted in accordance with the data control information, the data control information management means 103 corrects or modifies data control information in accordance with information on a data processing apparatus and a data supplying apparatus. The information on the data processing apparatus is inquired to the data control information management means 103 by using a network address and a data management number, the information including an application registration number and environments of the data processing apparatus. The information on the data supplying apparatus is also inquired to the data control information management means 103, the information including an access status of a user and the like. In accordance with the modified control information, the control means 105 controls the data processing means 106 and controls the display means 107 to make it give a notice of the inhibition contents.

A series of processes to be described with this flow chart is assumed that the data processing means 106 is already activated because the processes are performed as a preliminary process of the data processing means 106 when an operator instructs the data processing means 106 to start image data processing such as editing and printing.

Referring to FIG. 21, at Step S2001 an operator instructs the data processing means 106 to edit the data. At Step S2002 the data management means 104 confirms whether the data file instructed to be edited at Step S2001 contains the data control information. If the data management means 104 cannot confirm a presence of data control information, the flow advances to Step S2003, whereas if confirmed, the data is transferred to the control means 105.

In this embodiment, a presence of data control information can be confirmed from a presence of the data management number and network address added to the data, as described in the modification of the first embodiment shown in FIG. 20. At Step S2003 it is checked whether the data management number exists in the data file. If the data management number does not exist, the data control information does not exists so that the flow advances to Step S2006. If the data management number exists, then at Step S2004 the information on the data processing apparatus is inquired to the data control information management means 103 by using the data management number. The information on the data processing apparatus includes an application registration number, an operating system, connection state of peripheral apparatuses such as a printer, data processing user ID and the like.

At Step S2005, in accordance with the supplied information on the data processing apparatus, information on the data supplying apparatus such as user access status is acquired. At Step S2006, in accordance with the information on the data processing apparatus inquired at Step S2004 and the information on the data supplying apparatus acquired at Step S2005, the data control information is modified and changed. At Step S2007, the data management means 104 acquires the modified and changed control information from the data control information management means 103.

At Step S2007, in accordance with the data control information, the control means 105 acquires the editing function to be inhibited from the control data shown in FIG. 7 in order to suppress the editing function of the data processing means 106. For example, if the image data control information acquired at Step S2007 is the editing inhibition first level which has no editing inhibition, there is no control data to be acquired, whereas if it is the second level, the control data at the second level is acquired, and if it is the third level, the control data at the second and third levels is acquired.

Next, at Step S2008 the control means 105 notifies the data processing means 106 of the inhibition function acquired at Step S2007 to inhibit to use the function. At Step S2009 the control means 105 instructs the display means 107 to display a notice of the inhibition function acquired at Step S2007 or instructs the display means 107 to display information on the data processing means 106 with the inhibition function acquired at Step S2008. If it is confirmed at Steps S2002 and S2003 that the data control information does not exist, then the inhibition process is not performed.

FIG. 22 is a diagram showing an example of the contents of a data file representative of the information on the data processing apparatus inquired to the data information management means 103.

In FIG. 22, reference numeral 1501 represents the contents of the data file storing information on the data processing apparatus. The information on the data processing apparatus is described divisionally for each type of information. Numerals such as "0001" and "0002" at the start of each row represent the type of information. In this example, "0001" represents a user registration number, and "0002" represents an application registration number. The following numbers represent actual numbers of each type of information. In this example shown in FIG. 22, the user registration number is "328519215".

Instead of the numeral string, a bit string may be used. The next "#" is a comment identifier for indicating that the following information is a comment on the editing inhibition information. Although "#" is used as the comment identifier, a comment descriptor such as in a program descriptive language is generally used. The comment descriptor may be expressed by a bit train the data analysis means 104 can recognize.

The character string, such as user ID following the comment descriptor is a comment on the editing inhibition information. The comment descriptor and comment may be omitted, which means that they are not essential for the data management means 104 to discriminate the image data control information.

Figure 23:
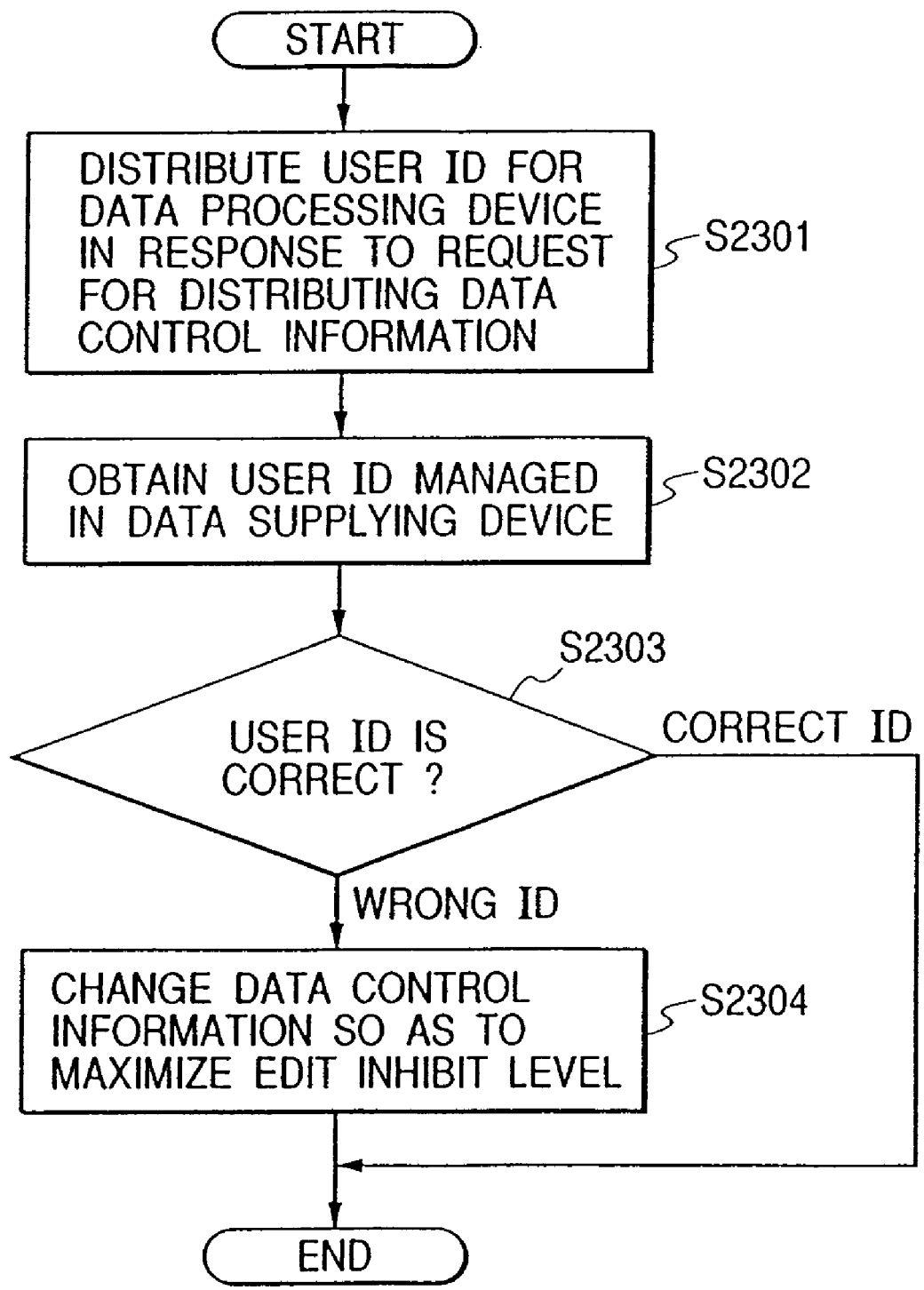
FIG. 23 is a flow chart illustrating a process of modifying and changing data control information in accordance with information supplied from a data processing apparatus and a data supplying apparatus according to the eleventh embodiment.

FIG. 23 is a flow chart illustrating a process to be executed by the data control information management means 103 to modify and change the data control information to be transferred, in accordance with the data control information supplied from the data management means 104. In this example of the process, the editing inhibition level is adjusted by referring to the user registration number, after the data control information is acquired from the data control information management means requested by the data management means 104.

Referring to FIG. 23, at Step S2301 the data management means 104 supplies the network address and data management number added to the data to be edited as well as the user registration number used by the data processing apparatus to the data control information management means 103 in order to request a distribution of the data control information from the data control information management means 103. At Step S2302, the data control information management means 103 acquires from the data supplying apparatus the user registration status corresponding to the user registration number supplied from the data management means 104.

If it is judged at Step S2303 that the user registration number is correct, then the flow control prepares for distributing the data control information itself requested at Step S2301 to the requesting side. If it is judged that the user registration number is incorrect, the editing inhibition level of the data control information requested at Step S2301 is changed to the highest level, and the control flow prepares for distributing the changed data control information to the data management means 104.

When the process of the flow chart shown in FIG. 23 is completed and the data control information is modified and changed in accordance with the information on the data processing apparatus and data supplying apparatus, the data control information is allowed to be distributed to the data management means 104.

As described above, according to this embodiment, processing data is restricted at a plurality of inhibition levels. It is therefore possible to restrict an editing operation so as to match an intention of a creative data provider.

Further, fine restriction can be realized without unnecessarily restricting a data user. It is therefore possible for a creative data user to process the data properly, and in addition, a restriction given to data can be explicitly notified.

By supplying related information such as the information on a data processing apparatus to the data supplying apparatus, control information suitable for the data processing apparatus can be selectively used. Further, if the data supplying apparatus checks the registration information such as a registration number of a data processing apparatus, data can be prevented from illegally processed.

What is claimed is:

1. An image editing apparatus arranged to execute a plurality of kinds of editing operations on image data corresponding to an image, comprising:

an editing unit configured to perform each kind of editing operation on the image data in accordance with control information that is added to the image data to permit or inhibit execution of each kind of editing operation on the image data;

a selection unit configured to select the image as the image data to be edited by said editing unit from a plurality of images displayed together on a screen;

a display unit configured to display items, of each kind of editing operation of the selected image on the screen in accordance with the control information added thereto in a manner that allows discrimination of whether execution of the editing operation on the selected image is permitted or inhibited; and a warning unit configured to display a warning panel of an image other than the selected image, independently of the items displayed by said display unit on the screen, if the execution of a permitted kind of editing operation on the image data of the selected image brings about the execution of an inhibited kind of editing operation on the image data of the image other than the selected image, wherein the inhibited kind of editing operation on the image data of the image other than the selected image is an editing operation of "overlap" which is the permitted kind of editing operation with respect to the selected image, so that said display unit displays the item of the editing operation of "overlap" so as to indicate that execution of the editing operation of "overlap" is permitted.

2. An apparatus according to claim 1, wherein said editing unit inhibits the execution of the permitted kind of editing operation on the image data of the selected image if the execution of a permitted kind of editing operation on the image data of the selected image brings about the execution of an inhibited kind of editing operation on the image data of the image other than the selected image.

3. An apparatus according to claim 1, wherein the permitted kind of editing operation on the selected image is an operation for moving the selected image, and the inhibited kind of editing operation of the image other than the selected image is an operation for superimposing the selected image on said image other than the selected image.

4. A control method of an image editing apparatus arranged to execute a plurality of kinds of editing operations on image data corresponding to an image, comprising the steps of:

performing a kind of editing operation, on the image data in accordance with control information added to the image data;

selecting the image as the image data to be edited in said editing operation performing step from a plurality of images displayed together on a screen;

displaying items, of each kind of editing operation of the selected image on the screen in accordance with the control information added to the image data of the selected image in a manner that allows discrimination of whether execution of the editing operation on the selected image is permitted or inhibited; and displaying a warning panel of an image other than the selected image, independently of the items displayed in said items displaying step on the screen, if the execution of a permitted kind of editing operation on the image data of the selected image brings about the execution of an inhibited kind of editing operation on the image data of the image other than the selected image, wherein the inhibited kind of editing operation on the image data of the image other than the selected image is an editing operation of "overlap" which is the permitted kind of editing operation with respect to the selected image, so that said items displaying step displays the item of the editing operation of "overlap" so as to indicate that execution of the editing operation of "overlap" is permitted.

5. A computer-readable storage medium storing a computer-executable program comprising code for causing a computer to execute a control method of an image editing apparatus arranged to execute a plurality of kinds of editing operations on image data corresponding to an image, the control method comprising the steps of:

performing kind of editing operation on the image data in accordance with control information added to the image data;

selecting the image as the image data to be edited in said editing operation performing step from a plurality of images displayed together on a screen;

displaying items of each kind of editing operation of the selected image on the screen in accordance with the control information added to the image data of the selected image in a manner that allows discrimination of whether execution of the editing operation on the selected image is permitted or inhibited; and displaying a warning panel of an image other than the selected image, independently of the items displayed in said items displaying step on the screen, if the execution of a permitted kind of editing operation on the image of the selected image brings about the execution of an inhibited kind of editing operation on the image data of the image other than the selected image, wherein the inhibited kind of editing operation on the image data of the image other than the selected image is an editing operation of "overlap" which is the permitted kind of editing operation with respect to the selected image, so that said items displaying step displays the item of the editing operation of "overlap" so as to indicate that execution of the editing operation of "overlap" is permitted.

* * * * *